US 11,556,610 B2

(12) United States Patent
Samanta et al.

(10) Patent No.: US 11,556,610 B2
(45) Date of Patent: Jan. 17, 2023

(54) CONTENT ALIGNMENT

(71) Applicant: ACCENTURE GLOBAL SOLUTIONS LIMITED, Dublin (IE)

(72) Inventors: Pratip Samanta, Bangalore (IN); Manash Jyoti Konwar, Dibrugarh (IN); Keshav Bohra, Thane (IN); Himani Shukla, Bangalore (IN); Nagendra Kumar Karamala, Madanapalle (IN); Madhura Shivaram, Bangalore (IN); Amit Sharma, Thane (IN); Sumeet Sawarkar, Nagpur (IN); Swati Tata, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 253 days.

(21) Appl. No.: 16/678,772

(22) Filed: Nov. 8, 2019

(65) Prior Publication Data
US 2021/0142356 A1 May 13, 2021

(51) Int. Cl.
*G06F 16/957* (2019.01)
*G06F 40/103* (2020.01)
*G06N 20/00* (2019.01)
*G06F 40/169* (2020.01)
*G06Q 30/02* (2012.01)
*G06V 30/413* (2022.01)
*G06V 30/414* (2022.01)

(52) U.S. Cl.
CPC ........ *G06F 16/9577* (2019.01); *G06F 40/103* (2020.01); *G06F 40/169* (2020.01); *G06N 20/00* (2019.01); *G06Q 30/0276* (2013.01); *G06V 30/413* (2022.01); *G06V 30/414* (2022.01); *G06Q 30/0244* (2013.01)

(58) Field of Classification Search
CPC .. G06F 16/9577; G06F 40/103; G06F 40/169; G06V 30/414
See application file for complete search history.

(56) References Cited

U.S. PATENT DOCUMENTS 10,095,677 B1\* 10/2018 Manohar ............ G06K 9/00449
2008/0107337 A1  5/2008 Furmaniak et al.
2009/0044106 A1\* 2/2009 Berkner ................ G06F 40/103
715/273

(Continued)

*Primary Examiner* — Scott T Baderman
*Assistant Examiner* — Seung Woon Jung
(74) *Attorney, Agent, or Firm* — Mannava & Kang, P. C.

(57) ABSTRACT

Examples of a content alignment system are provided. The system may receive a content record and a content creation requirement. The system may implement an artificial intelligence component to sort the content record into a plurality of objects and for identifying an object boundary for each of the plurality of objects. The system may identify a plurality of images and implement a first cognitive learning operation to identify an image boundary for each of the plurality of images. The system may identify a plurality of exhibits and implement a second cognitive learning operation to identify a data pattern associated with each of the plurality of exhibits. The system may implement a third cognitive learning operation for determining a content creation model by evaluating the plurality of objects, the plurality of images, and the plurality of exhibits. The system may generate a content creation output to resolve the content creation requirement.

20 Claims, 19 Drawing Sheets

(56) References Cited

U.S. PATENT DOCUMENTS

| | | |
|---|---|---|
| 2010/0281361 A1 | 11/2010 | Marchesotti |
| 2017/0024404 A1* | 1/2017 | Tocchini ................ G06N 20/00 |
| 2018/0300361 A1* | 10/2018 | Ben-Aharon ......... G06F 40/143 |
| 2019/0028607 A1* | 1/2019 | Katsura .............. G06K 9/00449 |
| 2019/0087639 A1* | 3/2019 | Crane ................ G06K 9/00442 |

* cited by examiner

FIG. 6B

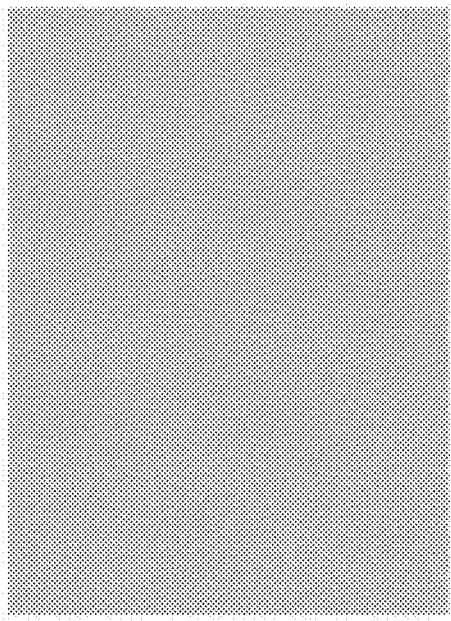

600C

<Hi | Hello | Dear | Hey | Aloha | Good Morning | Good Afternoon | Hola> <Dr. | | Doctor | Miss | Mr. | Mrs. | Ms. | Sir| Admiral | Brigadier General | Captain | Commander | Colonel | Corporal | General | Lieutenant | Lieutenant Commander | Lieutenant Colonel | Lieutenant General | Major | Major General | Rear Admiral | Sergeant> (30)[Insert first or last name}), <Lorem ipsum dolor sit amet, consectetur adipiscing elit. | Lorem ipsum dolor sit amet, consectetur adipiscing elit. | Lorem ipsum dolor sit amet, consectetur adipiscing elit.> Lorem ipsum dolor sit amet, consectetur adipiscing elit. <Lorem ipsum dolor sit amet, consectetur adipiscing elit.|Lorem ipsum dolor sit amet, consectetur adipiscing elit.>. Lorem ipsum dolor sit amet, consectetur adipiscing elit. ((User Phone)).

<Regards| Warm regards| Mahalo| Best| My best| Talk to you soon| See you soon| Thanks| Thank you| Gracias>, (30)[Enter your name, no title)

606

Lorem ipsum dolor sit amet,
consectetur adipiscing elit.
[ County, State ]

FIG. 6C

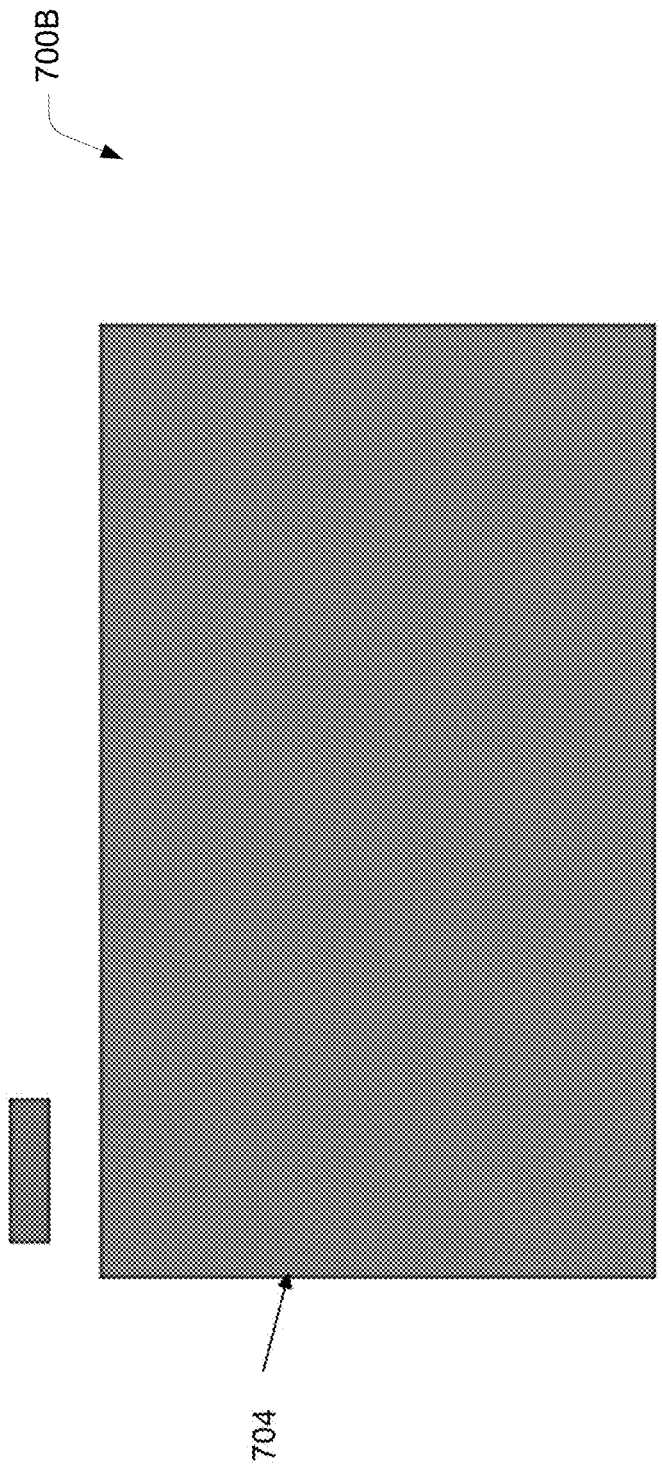
FY20 Incentives Programs
Join us to this session to learn about the new incentives programs to increase your profitability.
If you choose to participate in this session using XXXX Teams.
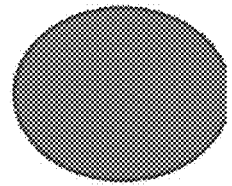
FIG. 7B

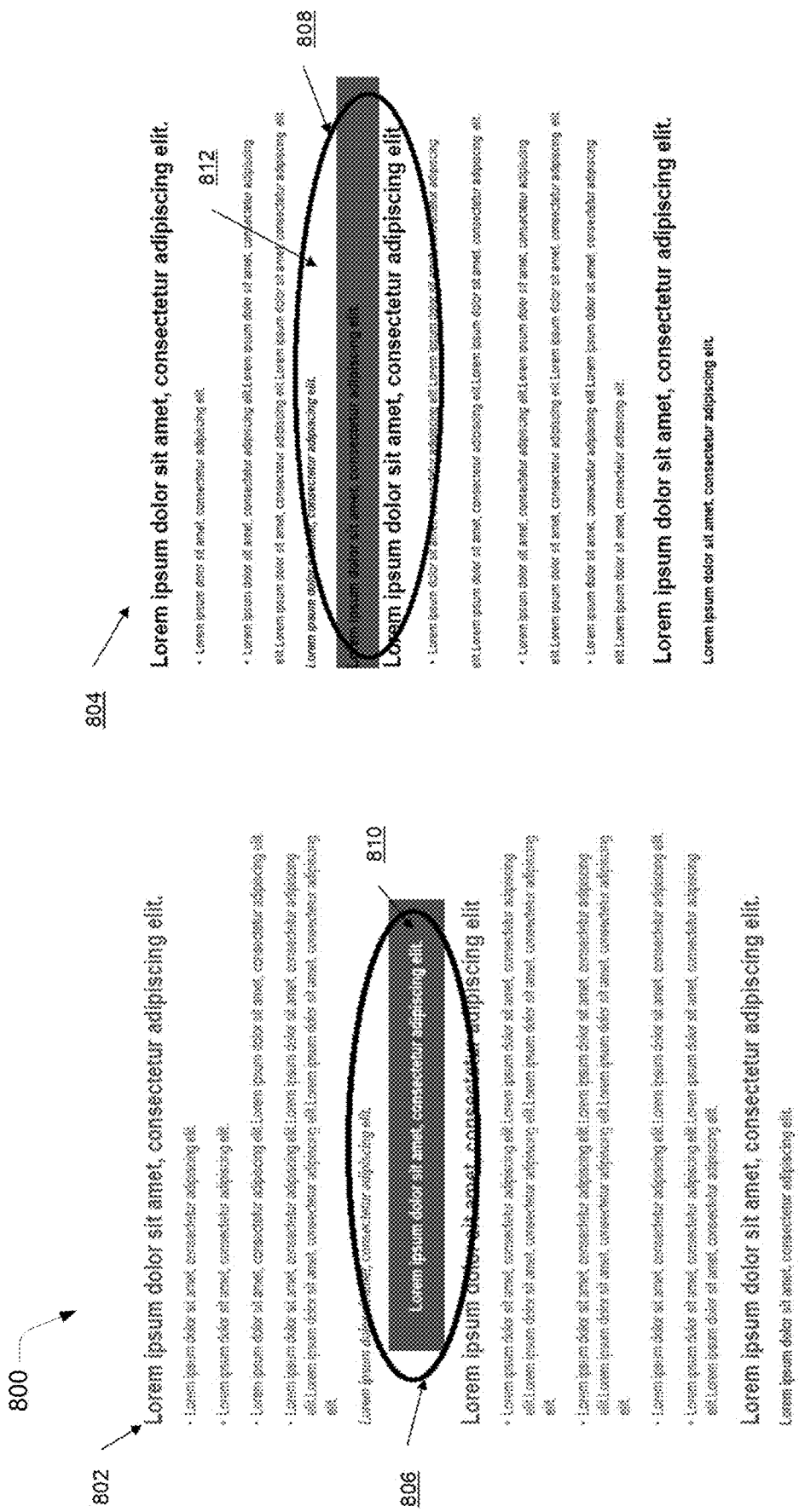

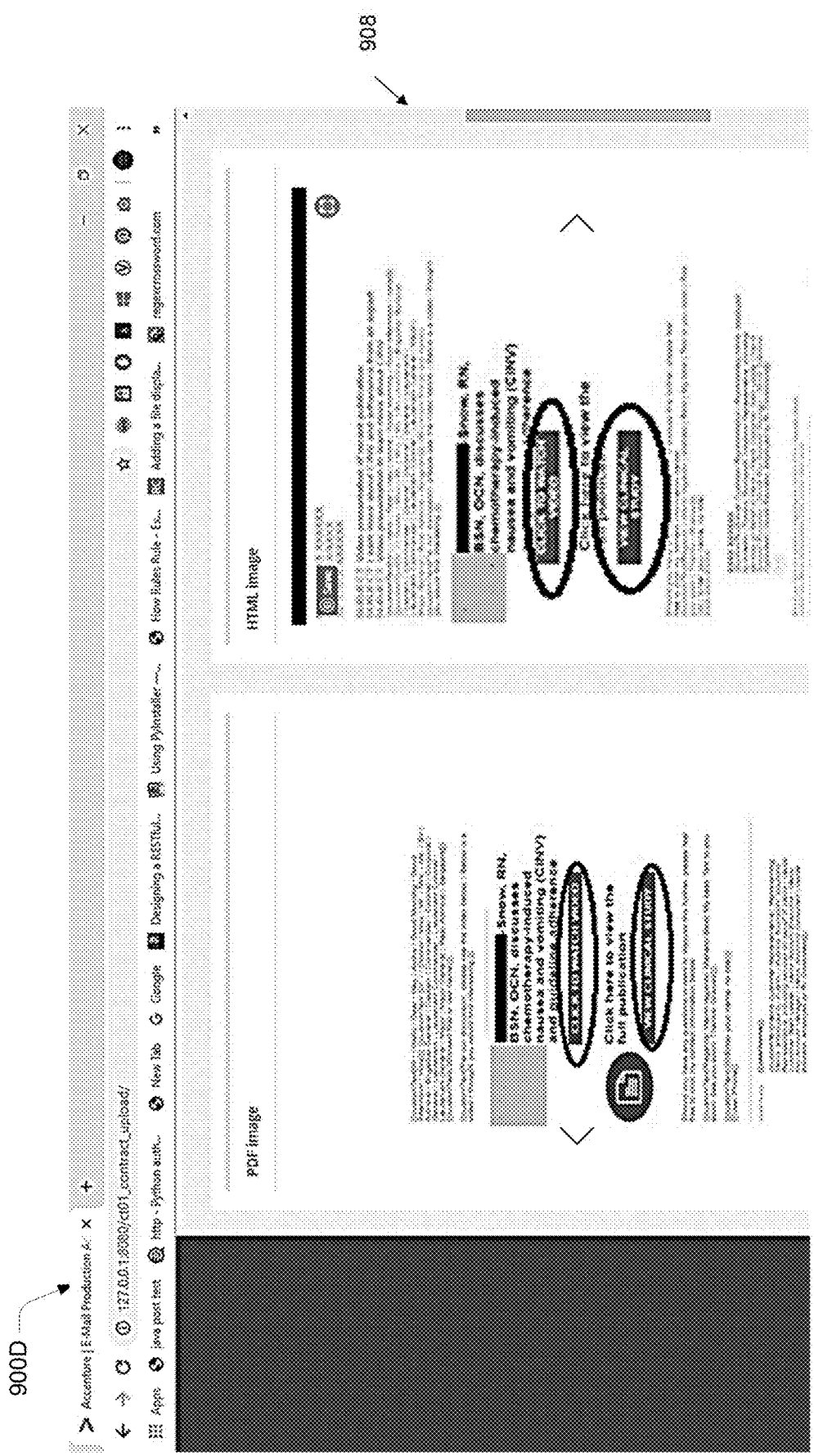

CONTENT ALIGNMENT

BACKGROUND

The importance of content marketing across various organizations has increased with the advent and rapid progression of digital marketing technologies. Various organizations across the globe have invested a vast amount of resources into the creation of effective product-related marketing text for content marketing. The marketing text may comprise, for example, a new product launch, a new feature highlight about an existing product, a new drug launch and its associated details on dosage, a set of health symptoms, and the like. This text may also include active hyperlinks, which may be useful for providing additional relevant information to a customer. Also, the marketing content may have to be configured to ensure compatibility with various digital channels such as, for example, email channels.

Many organizations may deploy various creative teams to create the marketing text for content marketing. Manual creation of an email compatible file from the marketing text may be cumbersome, complex, and time-intensive. Additionally, testing the email compatible file for assessing its quality against the marketing text may also be a labor-intensive time-consuming process. For example, the marketing text may involve substantial time and human resources with respect to work involved regarding the font size color, type of images, layout and the like. Furthermore, marketing text files may be manually compared to the email-compatible file for assessing features, such as, for example, spacing, font size, font color and type, superscripts and subscripts, an overall layout match, and the like. In addition to being susceptible to errors and time-intensive, a manual process of validating the marketing text with the email compatible file may not provide any quantitative values to identify the nature of the match and mismatch.

Therefore, to ensure effectiveness, efficiency and completeness, both qualitatively and quantitatively, a content alignment system may be required to ensure that a structure of the marketing text file in terms of segments and layout may automatically be transferred to the email compatible file. Additionally, there may be a requirement for a tool that may compare the email compatible file with the marketing text and highlight any differences between them. There may also be a requirement for a system to reduce the manual task of validation and also reduce the time needed to perform a quality assessment of the email compatible file.

Accordingly, a technical problem with the currently available systems for content alignment is that they may be inefficient, inaccurate, and/or not scalable. There is a need for a content alignment system that may account for the various factors mentioned above, amongst others, to generate an email compatible file from a given marketing text in an efficient and cost-effective manner.

BRIEF DESCRIPTION OF DRAWINGS

FIG. 6B illustrates a pictorial representation of a sample data from a content record deployed by a content alignment system, for content alignment according to an example embodiment of the present disclosure.

FIG. 6C illustrates a pictorial representation of a content creation output generated by deploying a content alignment system, according to an example embodiment of the present disclosure.

FIG. 7B illustrates a pictorial representation of a content creation output generated by deploying a content alignment system, according to an example embodiment of the present disclosure.

FIG. 8 illustrates a pictorial representation of a comparison between a content record and a content creation output by deploying a content alignment system, according to an example embodiment of the present disclosure.

FIGS. 9A-9D illustrate a pictorial representation of an output generated by the content alignment system at various stages of a content alignment process, according to an example embodiment of the present disclosure.

DETAILED DESCRIPTION

Figure 1:
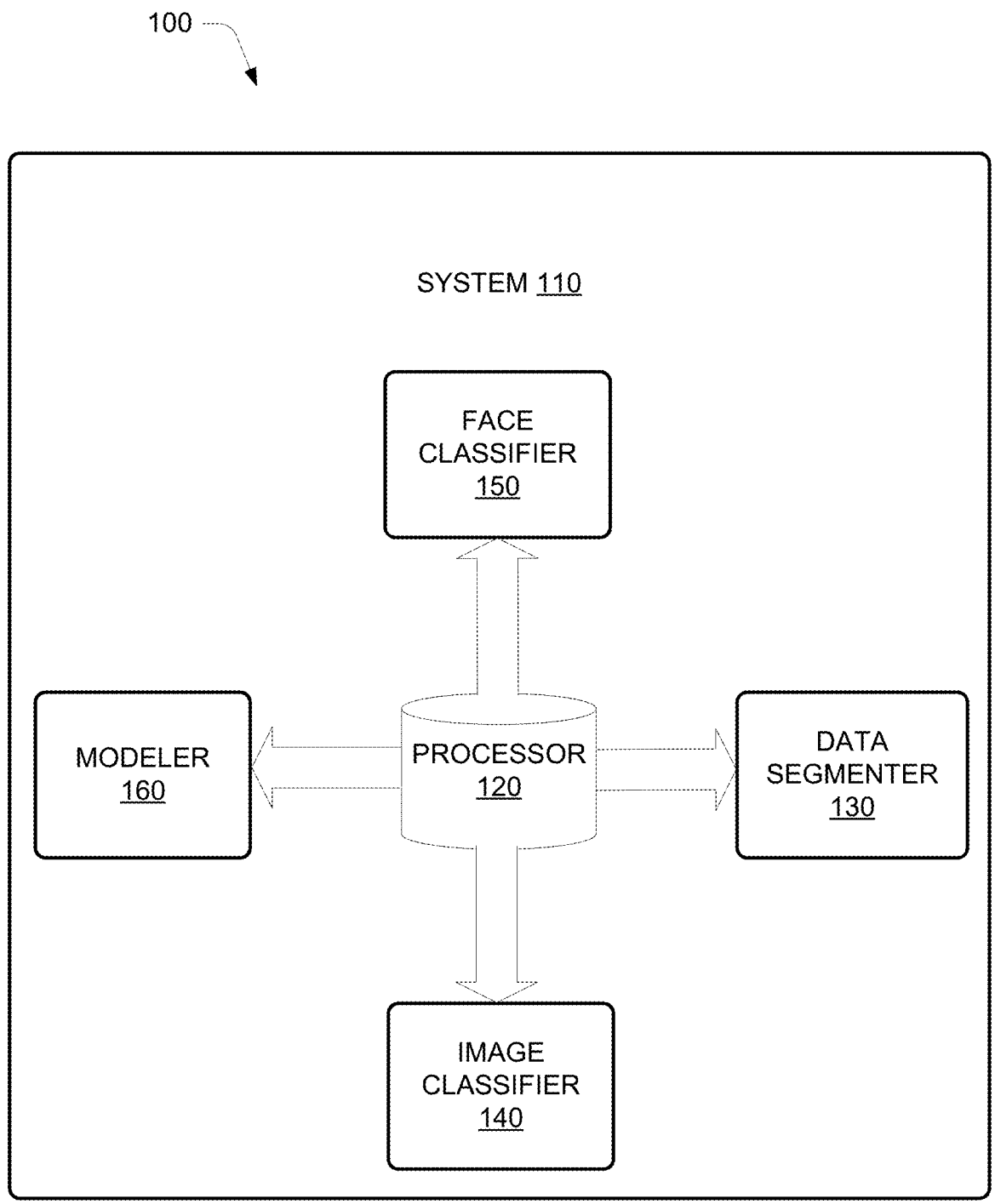
FIG. 1 illustrates a diagram for a content alignment system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for content alignment including a content alignment system (CAS). The content alignment system (referred to as "system" hereinafter) may be used to align content from a set of documents to HTML format. The HTML format may refer to Hypertext Markup Language, which may be a standard markup language for documents designed to be displayed in a web browser. The content alignment may have applications in a variety of organizational operations, for example, operations related to sales and marketing. The system may capture, for example, a layout, and a document style-related features of various segments of the document from a digitized text and convert them into a structured data document like an electronic mail. The system may identify the segments and the sequences of the various segments. In an example, a segment may refer to a block of text and/or images, which may contain multiple rows and/or columns. The system may evaluate the layout of each segment and the document style associated with each segment. The system may generate a new content based on the digitized text received by the system from a user. The system may compare the new content so generated with the received digitized content for validation. The system may rectify an error or a deviation, which may have occurred during the creating of the new content from the received digitized text.

The system may include a processor, a data segmenter, an image classifier, a face classifier, and a modeler. The processor may be coupled to the data segmenter, the image classifier, the face classifier, and the modeler. The data segmenter may receive a content record from a plurality of sources. The content record may be pertaining to processing a content creation requirement associated with a content creation operation. The data segmenter may implement an artificial intelligence component to sort the content record into a plurality of objects. The plurality of objects may be comprising a segment from the content record. The data segmenter may implement an artificial intelligence component to evaluate each of the plurality of objects for identifying an object boundary for each of the plurality of objects. The object boundary may include a data annotation associated with each of the plurality of objects.

The image classifier may identify a plurality of images from the plurality of objects based on the data annotation associated with each of the plurality of objects. The plurality of images may be comprising an image segment from the content record. The image classifier may implement a first cognitive learning operation to identify an image boundary for each of the plurality of images. The image boundary may include an image data annotation associated with each of the plurality of images. The face classifier may identify a plurality of exhibits from the plurality of objects based on the data annotation associated with each of the plurality of objects. The face classifier may implement a second cognitive learning operation to identify a data pattern associated with each of the plurality of exhibits. The data pattern may include an exhibit annotation associated with each of the plurality of exhibits.

The modeler may implement a third cognitive learning operation for determining a content creation model by evaluating the data annotation associated with each of the plurality of objects, the image data annotation associated with each of the plurality of images, and the exhibit annotation associated with each of the plurality of exhibits. The plurality of exhibits may be comprising a display trait from the content record. The modeler may generate a content creation output comprising the content creation model to resolve the content creation requirement. The content creation model may include the content record assembled in a data layout for resolving the content creation requirement.

The embodiments for the content creation requirement presented herein are exemplary in nature and should be treated as such. For the sake of brevity and technical clarity, the description of the content alignment system may be restricted to few exemplary embodiments, however, to a person skilled in the art it should be clear that the system may be used for the fulfillment of various content creation and content alignment requirements other than those mentioned hereinafter.

Accordingly, the present disclosure aims to provide a content alignment system that may account for the various factors mentioned above, amongst others, to multi-dimensional relationships between various text segments from a text document in an efficient, and cost-effective manner. Furthermore, the present disclosure may categorically analyze various parameters that may have an impact on deciding an appropriate alignment relationship amongst various text fragments from a given text document.

FIG. 1 illustrates a system for content alignment system 110 (referred to as system 110 hereinafter), according to an example implementation of the present disclosure. In an example, the system 110 may include a processor 120. The processor 120 may be coupled to a data segmenter 130, an image classifier 140, a face classifier 150, and a modeler 160.

In accordance with an embodiment of the present disclosure, the data segmenter 130 may receive a content record from a plurality of sources. The content record may be pertaining to processing a content creation requirement associated with a content creation operation. The content record may be a digital document, which may be created by an organization for achieving the purpose of the content creation requirement. In an example, the content creation requirement may be associated with at least one of a process, an organization, and an industry-relevant for content creation operations. For example, the content creation requirement may be associated with the sales and marketing operations of an organization. The content creation requirement may be associated with capturing all of a layout, and a document style-related features of various segments of the document from a digitized text for creating an electronic mail from the digitized text in an automated manner. In an example, the content creation operation may indicate an operation, which may refer to the purpose of alignment of content from a text document in an automated manner for creation of an HTML file format content comprising the same content as the text document. For example, the content creation operations may include receiving a digital document, which may be comprising marketing content related to a product and generating an electronic mail digital document in an HTML file format comprising the same marketing content. The embodiments for the content record, the content creation requirement, and the content creation operation presented herein are exemplary in nature and should be treated as such.

The data segmenter 130 may implement an artificial intelligence component to sort the content record into a plurality of objects. The plurality of objects may be comprising a segment from the content record. In an example, a segment may refer to a block of text, which may contain multiple rows and/or columns. In accordance with various embodiments of the present disclosure, the artificial intelligence component may include artificial intelligence techniques, for example, a neural network approach, a machine learning approach, and the like. The artificial intelligence component may be implemented with respect to segment identification and extraction. The artificial intelligence component may capture all the layout as well as style-related features of segments of text from digitized text into structured data along with the method for identifying the segments and the sequences of the segments. The artificial intelligence techniques, for example, a neural network, a machine learning approach may evaluate the layout of each segment as well as the style associated with each segment for identifying the plurality of objects. The neural network approach for evaluating the layout of each segment as well as the style associated with each segment may include, for example, deployment of a Convolution Neural Network (CNN). This approach may be referred to hereinafter as the "CNN based approach" (explained in detail by way of FIG. 2). The machine learning approach for evaluating the layout of each segment as well as the style associated with each segment may include a complete text-based method. The complete text-based method may include a digitized text to be extracted from the content record. The plurality of objects may be identified depending upon a header section, a footer section or any other section of the content record (explained in detail by way of FIG. 2).

The data segmenter 130 may implement the artificial intelligence component to evaluate each of the plurality of objects for identifying an object boundary for each of the plurality of objects. The object boundary may be a demarcation separating various objects amongst the plurality of objects. The data segmenter 130 may analyze an object from the plurality of objects demarcated by the object boundary. In an example, the object boundary may be identified for an object based on a similar font style, a similar text segment, for example, all text related to introduction of a product may be amalgamated into one object and demarcated by the object boundary. The object boundary may be including a data annotation associated with each of the plurality of objects. The data annotation may refer to an identification of a text, a style, a font, a context, an external link, an image, and the like from an object demarcated by the object boundary. In an example, the data annotation may refer to a meaning of the object demarcated by the object boundary as deciphered by the data segmenter 130 through the implementation of the artificial intelligence component.

The image classifier 140 may identify a plurality of images from the plurality of objects based on the data annotation associated with each of the plurality of objects. The plurality of images may be comprising an image segment from the content record. As mentioned above, the data annotation may include a meaning of the object demarcated by the object boundary as deciphered by the data segmenter 130 through the implementation of the artificial intelligence component. In an example, the data annotation may interpret a part of the object demarcated by the object boundary to be an image, for example, an organization logo, an image of a person, an image of a product, an image of a hyperlink and the like. The image classifier 140 may identify such data annotations associated with the object demarcated by the object boundary as a part of the plurality of images. In an example, the plurality of images may include an organization logo, an image of a person, an image of a product, an image of a hyperlink and the like. The plurality of images may include any image present in the content record. The image classifier 140 may extract the plurality of images from the content record as per the information identified by the segment (explained in detail by way of FIG. 2).

The image classifier 140 may implement a first cognitive learning operation to identify an image boundary for each of the plurality of images. The image boundary may be including an image data annotation associated with each of the plurality of images. In accordance with various embodiments of the present disclosure, the first cognitive learning operation may create the image boundary for each of the plurality of images based on an identification of a set of pixel coordinates of the image in the content record (explained in detail by way of FIG. 2). In an example, an OpenCV™ library may facilitate in recognizing the images from the content record. The image boundary may act as a demarcation separating the plurality of images amongst the plurality of objects. The image data annotation may be a piece of information identified by the image classifier 140 from an image from the plurality of images demarcated by the image boundary. For example, an object from the plurality of objects may be identified to comprise multiple images, the image boundary may separate those multiple images from each other and also from other components of the object. The image data annotation associated with each of those multiple images may be information related to an image being identified as an organization logo, an image of a person, an image of a product, an image of a hyperlink and the like. In an example, the image classifier 140 may resize the plurality of images based on the image data annotation and adjust the image boundary accordingly. For example, if an image may be identified as an organization logo, then the image classifier 140 may resize the organization logo to align the same on an HTML format content page and adjust the image boundary to only include the organization logo. In an example, if an image may be identified as a human face, the image classifier 140 may resize the image to include the human face and a peripheral empty space for augmenting clarity of the image identified as a human face. The image classifier 140 may deploy the image data annotation associated with the image boundary for alignment of the plurality of images on the HTML based on the image data annotation and the data annotation.

The face classifier 150 may identify a plurality of exhibits from the plurality of objects based on the data annotation associated with each of the plurality of objects. The plurality of exhibits may be comprising a display trait from the content record.

As mentioned above, the data annotation may include a meaning of the object demarcated by the object boundary as deciphered by the data segmenter 130 through the implementation of the artificial intelligence component. In an example, the data annotation may interpret a part of the object demarcated by the object boundary to be an external content button, a font size, and a font style and color information with respect to the object demarcated by the object boundary. The face classifier 150 may identify such data annotations as a part of the plurality of exhibits. In an example, the display traits that form the plurality of exhibits may include an external content button, a font size, a font style, and color information and the like. The plurality of exhibits may include any styling information present in the content record. The face classifier 150 may extract the plurality of exhibits from the content record as per the information identified by the segment.

The face classifier 150 may implement a second cognitive learning operation to identify a data pattern associated with each of the plurality of exhibits. The data pattern may refer to an external content button, a font size, a font style, and color information. In an example, the second cognitive learning operation may deploy a span detection algorithm for identifying multiple fonts, multiple styles, various colors, various external content buttons in the same object from the plurality of objects. The data pattern associated with the plurality of exhibits may include each of these multiple fonts, multiple styles, various colors, various external content buttons. The span detection algorithm, may identify and divide the content record with multiple styles some of which may be overlapping. This may be done via the string index matching across the different spans. The "span" may be a set of closer appropriately chosen groups of the data pattern occurrences in a document. In an example, the data pattern may include content font information, content font-size information, a content font style information, and content color information.

The data pattern may be including an exhibit annotation associated with each of the plurality of exhibits. The exhibit annotation may be a piece of information identified by the face classifier 150 from an exhibit from the plurality of exhibits associated with a specific data pattern. In an example, the exhibit annotation may include information regarding an external content button, information regarding various fonts, styles, and colors, which may be used throughout the content record, and the like. The face classifier 150 may implement the second cognitive learning operation to identify a plurality of data patterns associated with each exhibit from the plurality of exhibits based on the display trait associated with each the plurality of exhibits. In an example, a set of multiple fonts in the same segment may be identified by the span detection algorithm.

In an example, the face classifier 150 may implement the second cognitive learning operation to correlate the data pattern associated with each of the plurality of exhibits with the data annotation associated with each of the plurality of objects for determining a plurality of linkages amongst the plurality of objects. In an example, the external content button may be identified based on the metadata associated with a set of pixels in the content record. The data annotations may serve as the metadata set for mapping relationships between an external content button and a text over which the external content button may be applied, thereby creating a linkage from the plurality of linkages between the data annotation and the data pattern. The exhibit annotation may be detected using the external content button and text positions in the documents.

The modeler 160 may implement a third cognitive learning operation for determining a content creation model by evaluating the data annotation associated with each of the plurality of objects, the image data annotation associated with each of the plurality of images, and the exhibit annotation associated with each of the plurality of exhibits. In an example, the third cognitive learning operation may deploy a JavaScript Object Notation™ (JSON) format for determining the content creation model. The data for determining the content creation model may be obtained from the data annotation, the image data annotation, and the exhibit annotation may be in an unstructured format and the data annotation, the image data annotation, and the exhibit annotation done at a character level. The data for determining the content creation model may include font style, boundaries for a specific character, size, and color of the character. The modeler 160 may create a structure (JSON™ format) for paragraphs combining this information of characters into a paragraph level information for generation of the HTML. The JSON™ may be further utilized to detect segmentation for the paragraph as it may be a header, a title, a body or a footer section in the content record using the content creation model.

The modeler 160 may generate a content creation output comprising the content creation model to resolve the content creation requirement. The content creation model may be including the content record assembled in a data layout for resolving the content creation requirement. The content creation model may assist to find a correlation among multiple paragraphs to preserve the data layout from the content record. The data layout for resolving the content creation requirement may be the same as the data layout for the content record. In an example, the content creation output may include an HTML based electronic mail created from the content record.

In accordance with various embodiments of the present disclosure, the modeler 160 may compare the content creation model with the content record for identifying a content deviation to validate the content creation model. The modeler 160 may implement the third cognitive learning operation for rectifying the content deviation to determine an updated content creation model (explained further by way of FIG. 8).

The embodiments for the artificial intelligence component, the first cognitive learning operation, the second cognitive learning operation, and the third cognitive learning operation presented herein are exemplary in nature and should be treated as such. For the sake of brevity and technical clarity, the description of the content alignment system may be restricted to a few exemplary embodiments, however, to a person skilled in the art it should be clear that the system might be used for the fulfillment of various content alignment requirements other than those mentioned hereinafter.

Figure 2:
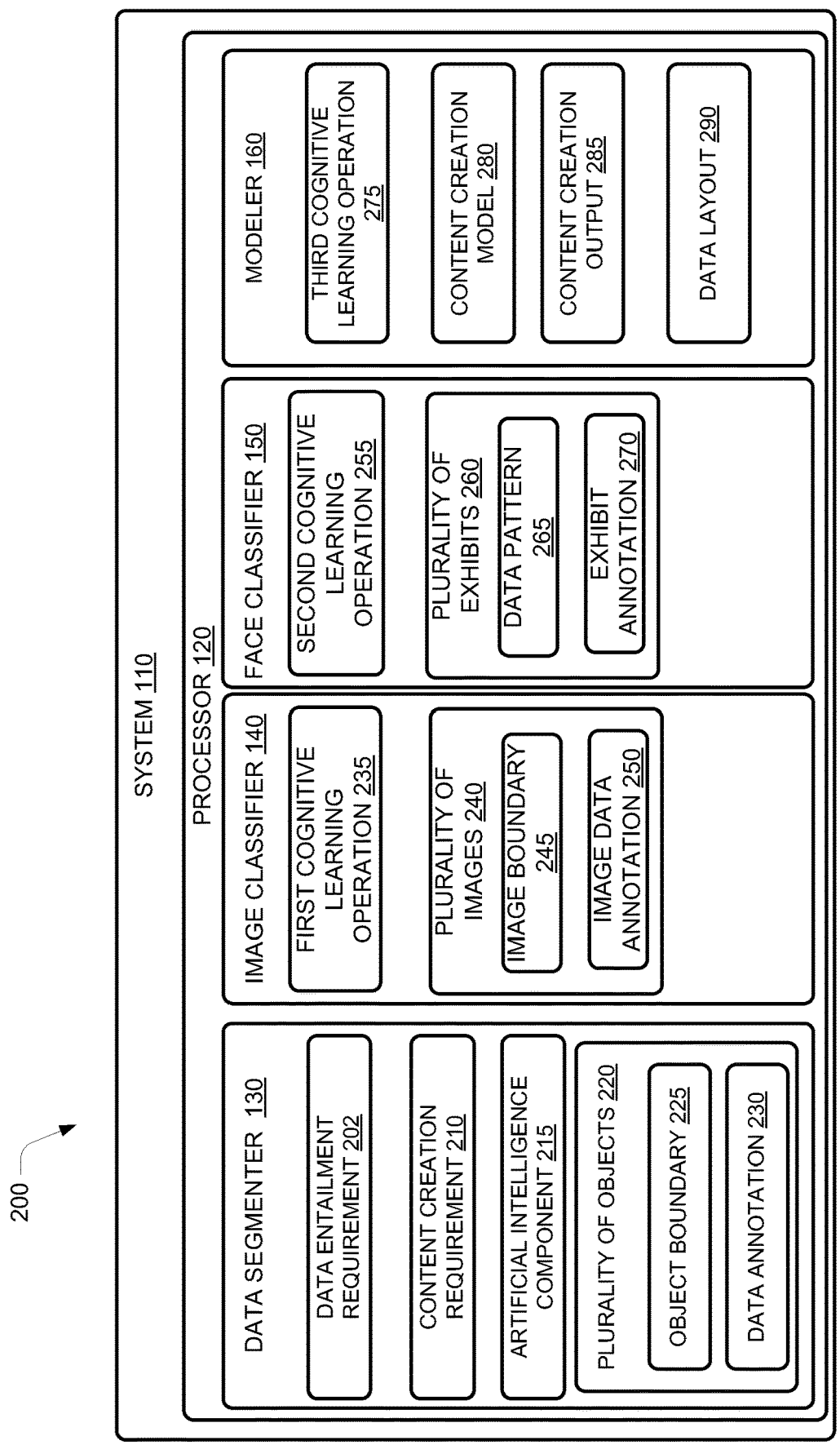
FIG. 2 illustrates various components of a content alignment system, according to an example embodiment of the present disclosure.

FIG. 2 illustrates various components of a content alignment system, according to an example embodiment of the present disclosure. The processor 120 may be coupled to the data segmenter 130, the image classifier 140, the face classifier 150, and the modeler 160.

In accordance with an embodiment of the present disclosure, the data segmenter 130 may receive a content record 205 from a plurality of sources. The content record 205 may pertain to processing a content creation requirement 210 associated with a content creation operation. The content record 205 may be a digital document, which may be created by an organization for achieving the purpose of the content creation requirement. In an example, the content creation requirement 210 may be associated with at least one of a process, an organization, and an industry-relevant for content creation operations. For example, the content creation requirement 210 may be associated with the sales and marketing operations of an organization. The content creation requirement 210 may be associated with capturing all of a layout, and a document style-related features of various segments of the document from a digitized text for creating an electronic mail from the digitized text in an automated manner. In an example, the content creation operation may indicate an operation, which may refer to the purpose of alignment of content from a text document in an automated manner for creation of an HTML file format content comprising the same content as the text document. For example, content creation operations may include receiving a digital document comprising marketing content related to a product and generating an electronic mail digital document in an HTML file format comprising the same marketing content. The embodiments for the content record 205, the content creation requirement, and the content creation operation presented herein are exemplary in nature and should be treated as such.

The data segmenter 130 may implement an artificial intelligence component 215 to sort the content record 205 into a plurality of objects 220. The plurality of objects 220 may be comprising a segment from the content record 205. In an example, a segment may refer to a block of text, which may contain multiple rows and/or columns from the content record 205. In accordance with various embodiments of the present disclosure, the artificial intelligence component 215 may include artificial intelligence techniques, for example, a neural network approach, a machine learning approach, and the like. The artificial intelligence component 215 may be implemented with respect to segment identification and extraction. The artificial intelligence component 215 may capture all the layout as well as style-related features of segments of text from digitized text into structured data along with the method for identifying the segments and the sequences of the segments. The artificial intelligence techniques, for example, a neural network, a machine learning approach may evaluate the layout of each segment as well as the style associated with each segment for identifying the plurality of objects 220. The neural network approach for evaluating the layout of each segment as well as the style associated with each segment may include, for example, deployment of a Convolution Neural Network (CNN). This approach may be referred to hereinafter as the "CNN based approach". The machine learning approach for evaluating the layout of each segment as well as the style associated with each segment may include a complete text-based method where a digitized text may be extracted from the content record 205 and the plurality of objects 220 may be identified depending upon it's a header section, a footer section or any other section of the content record 205.

In accordance with various embodiments of the present disclosure, the CNN based approach may be an image-based approach where the artificial intelligence component 215 may identify the plurality of objects 220 in an image format. The CNN based approach may be implemented wherein, the content record 205 may comprise a complex layout involving multiple columns and rows across different sections. The CNN based approach may be useful in cases where the image and text may be overlaid over each other in the content record 205. The CNN based approach may identify both the images and as well as text as a plurality of object images. The plurality of object images may be processed by the system 110 the same as the plurality of objects 220, and should be treated as such. The CNN based approach may include converting the content record 205 to an object image page by page, for example, every page from the content record 205 may be converted to an object image. The object image may be studied and annotated into multiple segments comprising various rows and columns (explained further by way of FIG. 5). The annotated data may be trained to build a convolution neural network (CNN) to detect the segment boundaries. In an example, the layers of the CNN for training the CNN model may include, CONV™, ReLU™, and Fiber Channel (FC) layers.

The machine learning approach implemented by the artificial intelligence component 215 may include extracting a text from the content record 205 along with features such as font style, size and all other style features in the form of the plurality of objects 220. The machine learning approach may identify the coordinates of each object from the plurality of objects 220 while extracting the text. The text may be annotated to identify the different sections like a header, a footer and the like. In an example, the machine learning approach may use a trained XGBoost™ model using the annotated data forming the Term Frequency-Inverse Document Frequency (TF-IDF) vector. The TF-IDF vector may be an algorithm to transform text into a meaningful representation of numbers. The technique may be widely used to extract various features like a font-style, a font size, a text location co-ordinates across various NLP applications. The data segmenter 130 may be developed to identify the sequence and type of segment (header, footer, sequence number. The machine learning approach may be when the content record 205 may follow a layout without nesting of columns within each segment. The machine learning approach may be used in cases where the segments like the header and footer have to be given a different treatment across all the documents.

In accordance with various embodiments of the present disclosure, the artificial intelligence component 215 may deploy any of the methods mentioned above for identifying various segments from the content record 205. The CNN based approach may be deployed for complex layouts may perform better on unseen layouts patterns of the content record 205. The machine learning approach may be deployed for simple layouts. The artificial intelligence techniques (also referred to as "models" hereinafter) described above may identify the best layout possible for a given content record 205 in terms of rows and columns. The models may run through multiple documents and patterns of the layout (rows, nesting of rows and columns) and present the most optimal layout in terms of ability to effectively communicate the information sent out in the email. In an example, the models may present to a user the best layout and a plurality of other possible data lay-outs for the content record 205 for identifying the most likely layout. Therefore, a user may get an option to examine multiple layouts which they might not have thought of without assistance from the models. This augmentation may provide an ability for the user to explore the different layout patterns.

In an example, the identification of which of the models described above may be better for a given content record 205 may be done manually by a user. In an example, the user may define the complexity of the layout of a document in terms of nesting of the rows and columns within a segment. The models may be trained to automatically pick up the model depending on the complexity of the layout. For example, a part of the content record 205 may be run through a previously built CNN based model. If CNN predicts layouts with no nesting of rows and columns, then the machine learning approach may be automatically selected for the future part of the content record 205 thereby increasing the effectiveness and level of automation.

The data segmenter 130 may implement the artificial intelligence component 215 to evaluate each of the plurality of objects 220 for identifying an object boundary 225 for each of the plurality of objects 220. The object boundary 225 may be a demarcation separating various objects amongst the plurality of objects 220. The data segmenter 130 may analyze an object from the plurality of objects 220 demarcated by the object boundary 225. In an example, the object boundary 225 may be identified for an object based on a similar font style, a similar, text segment, for example, all text related to the introduction of a product may be amalgamated into one object and demarcated by the object boundary 225. The object boundary 225 may be including a data annotation 230 associated with each of the plurality of objects 220. The data annotation 230 may refer to an identification of a text, a style, a font, a context, an external link, an image, and the like from an object demarcated by the object boundary 225. In an example, the data annotation 230 may refer to a meaning of the object demarcated by the object boundary 225 as deciphered by the data segmenter 130 through implementation of the artificial intelligence component 215.

The image classifier 140 may identify a plurality of images 240 from the plurality of objects 220 based on the data annotation 230 associated with each of the plurality of objects 220. The plurality of images 240 may be comprising an image segment from the content record 205. As mentioned above, the data annotation 230 may include a meaning of the object demarcated by the object boundary 225 as deciphered by the data segmenter 130 through the implementation of the artificial intelligence component 215. In an example, the data annotation 230 may interpret a part of the object demarcated by the object boundary 225 to be an image, for example, an organization logo, an image of a person, an image of a product, an image of a hyperlink and the like. The image classifier 140 may identify such data annotations 230 associated with the object demarcated by the object boundary 225 as a part of the plurality of images 240. In an example, the plurality of images 240 may include an organization logo, an image of a person, an image of a product, an image of a hyperlink and the like. The plurality of images 240 may include any image present in the content record 205. The image classifier 140 may extract the plurality of images 240 from the content record 205 as per the information identified by the segment.

The image classifier 140 may implement a first cognitive learning operation 235 to identify an image boundary 245 for each of the plurality of images 240. The image boundary 245 may be including an image data annotation 250 associated with each of the plurality of images 240. In accordance with various embodiments of the present disclosure, the first cognitive learning operation 235 may create the image boundary 245 for each of the plurality of images 240 based on an identification of a set of pixel coordinates of the image in the content record 205. In an example, an OpenCV™ library may facilitate in recognizing the images from the content record 205. The image boundary 245 may be a may be a demarcation separating the plurality of images 240 amongst the plurality of objects 220. The image data annotation 250 may be a piece of information identified by the image classifier 140 from an image from the plurality of images 240 demarcated by the image boundary 245. For example, an object from the plurality of objects 220 may be identified to comprise multiple images, the image boundary 245 may separate those multiple images from each other and also from other components of the object. The image data annotation 250 associated with each of those multiple images may be information related to an image being identified as an organization logo, an image of a person, an image of a product, an image of a hyperlink and the like. In an example, the image classifier 140 may resize the plurality of images 240 based on the image data annotation 250 and adjust the image boundary 245 accordingly. For example, if an image may be identified as an organization logo, then the image classifier 140 may resize the organization logo to align the same on an HTML format content page and adjust the image boundary 245 to only include the organization logo. In an example, if an image may be identified as a human face, the image classifier 140 may resize the image to include the human face and a peripheral empty space for augmenting clarity of the image identified as a human face. The image classifier 140 may deploy the image data annotation 250 associated with the image boundary 245 for alignment of the plurality of images 240 on the HTML based on the image data annotation 250 and the data annotation 230.

In accordance with various embodiments of the present disclosure, the first cognitive learning operation 235 may reduce noise and unwanted data in the plurality of images 240. The first cognitive learning operation 235 may convert the plurality of images 240 to grayscale using, for example, an OpenCV's™ cvtColor™ method. The cvtColor™ method may convert an image from one color space to another. An output of the above step may then be blurred to remove noise using a Gaussian™ blur with a filter of size, for example, 3×3. The image classifier may run multiple filter size variants to achieve the highest precision. The output from the Gaussian™ blur may be given to an image thresholding function of the first cognitive learning operation 235 to reduce the noise and unwanted data even further. In an example, the first cognitive learning operation 235 may deploy an adaptive Gaussian™ thresholding and an inverted binary output to have a clear image with less noise and unwanted data. The image classifier 140 may deploy the OpenCV's™ with the help of the location of the contours for identifying the image after the image thresholding function has been implemented. The image classifier 140 may create bounding boxes and extract the images by using an image cropping method with coordinates of the bounding boxes as a size reference. The extracted images may be further cropped and/or resized and aligned onto an HTML format.

The face classifier 150 may identify a plurality of exhibits 260 from the plurality of objects 220 based on the data annotation 230 associated with each of the plurality of objects 220. The plurality of exhibits 260 may be comprising a display trait from the content record 205. As mentioned above, the data annotation 230 may include a meaning of the object demarcated by the object boundary 225 as deciphered by the data segmenter 130 through the implementation of the artificial intelligence component 215. In an example, the data annotation 230 may interpret a part of the object demarcated by the object boundary 225 to be an external content button, a font size, a font style and color information with respect to the object demarcated by the object boundary 225. The face classifier 150 may identify such data annotations 230 as a part of the plurality of exhibits 260. In an example, the display traits that form the plurality of exhibits 260 may include an external content button, a font size, a font style, and color information and the like. The plurality of exhibits 260 may include any styling information present in the content record 205. The face classifier 150 may extract the plurality of exhibits 260 from the content record 205 as per the information identified by the segment.

The face classifier 150 may implement a second cognitive learning operation 255 to identify a data pattern 265 associated with each of the plurality of exhibits 260. The data pattern 265 may refer to an external content button, a font size, a font style, and color information. In an example, the second cognitive learning operation 255 may deploy a span detection algorithm for identifying multiple fonts, multiple styles, various colors, various external content buttons in the same object from the plurality of objects 220. The data pattern 265 associated with the plurality of exhibits 260 may include each of these multiple fonts, multiple styles, various colors, various external content buttons. The span detection algorithm, may identify and divide the content record 205 with multiple styles some of which may be overlapping. This is one via the string index matching across the different spans. The "span" may be a set of closer appropriately chosen groups of the data pattern 265 occurrences in a document. In an example, the data pattern 265 may include content font information, content font-size information, a content font style information, and content color information.

The data pattern 265 may be including an exhibit annotation 270 associated with each of the plurality of exhibits 260. The exhibit annotation 270 may be a piece of information identified by the face classifier 150 from an exhibit from the plurality of exhibits 260 associated with a specific data pattern 265. In an example, the exhibit annotation 270 may include information regarding an external content button, information regarding various fonts, styles, and colors, which may be used throughout the content record 205, and the like. The face classifier 150 may implement the second cognitive learning operation 255 to identify a plurality of data pattern 265s associated with each exhibit from the plurality of exhibits 260 based on the display trait associated with each the plurality of exhibits 260. In an example, a set of multiple fonts in the same segment may be identified by the span detection algorithm.

In an example, the face classifier 150 may implement the second cognitive learning operation 255 to correlate the data pattern 265 associated with each of the plurality of exhibits 260 with the data annotation 230 associated with each of the plurality of objects 220 for determining a plurality of linkages amongst the plurality of objects 220. In an example, the external content button may be identified based on the metadata associated with a set of pixels in the content record 205. The data annotations 230 may serve as the metadata set for mapping relationships between an external content button and a text over which the external content button may be applied, thereby creating a linkage from the plurality of linkages between the data annotation 230 and the data pattern 265. The exhibit annotation 270 may be detected using the external content button and text positions in the documents.

The modeler 160 may implement a third cognitive learning operation 275 for determining a content creation model 280 by evaluating the data annotation 230 associated with each of the plurality of objects 220, the image data annotation 250 associated with each of the plurality of images 240, and the exhibit annotation 270 associated with each of the plurality of exhibits 260. In an example, the third cognitive learning operation 275 may deploy a JavaScript Object Notation™ (JSON) format for determining the content creation model 280. The data for determining the content creation model 280 may be obtained from the data annotation 230, the image data annotation 250, and the exhibit annotation 270 may be in an unstructured format and the data annotation 230, the image data annotation 250, and the exhibit annotation 270 done at a character level. The data for determining the content creation model 280 may include font style, boundaries for a specific character, size, and color of the character. The modeler 160 may create a structure (JSON™ format) for paragraphs combining this information of characters into a paragraph level information for generation of the HTML. The JSON™ may be further utilized to detect segmentation for the paragraph as it may be a header, a title, a body or a footer section in the content record 205 using the content creation model 280.

The modeler 160 may generate a content creation output 285 comprising the content creation model 280 to resolve the content creation requirement. The content creation model 280 may be including the content record 205 assembled in a data layout 290 for resolving the content creation requirement. The content creation model 280 may assist to find a correlation among multiple paragraphs to preserve the data layout 290 from the content record 205. The data layout 290 for resolving the content creation requirement 210 may be the same as the data layout 290 for content record 205. In an example, the content creation output 285 may include an HTML based electronic mail created from the content record 205. The modeler 160 may identify the segmentation and layout for the content creation output 285 as created by the CNN through the implementation of the artificial intelligence component 215, the first cognitive learning operation 235, and the second cognitive learning operation 255. In an example, the data layout 290 may be in the form of an HTML file along with location co-ordinates, which may post-processed to convert to a TR/TD format. The HTML tables may arrangement of data like text, images, links, other tables, etc. into rows and columns of cells. The HTML tables may be created using the <table> tag in which the <tr> tag may be used to create table rows and <td> tag may be used to create data cells.

In accordance with various embodiments of the present disclosure, the modeler 160 may compare the content creation model 280 with the content record 205 for identifying a content deviation to validate the content creation model 280. The modeler 160 may implement the third cognitive learning operation 275 for rectifying the content deviation to determine an updated content creation model 280 (explained further by way of FIG. 8).

In operation, the system 110 may be used to create an HTML based content from the content record 205 for resolving the content creation requirement. The content record 205 may be in any format, for example, PDF®, DOCX®, PPTX®, and the like. The content creation requirement 210 may be to create the content in the HTML based format for executing a content creation operation. The content creation operation may be, for example, a sales and marketing operation of an organization. The content record 205 may be received by a user of the system 110. The data segmenter 130 of the system 110 may segregate the content record 205 in the plurality of objects 220. The plurality of objects 220 may include various segments of the content record 205 demarcated by the object boundary 225. The data segmenter 130 may be annotation each object from the plurality of objects 220 through the data annotation 230. In an example, the data segmenter 130 may implement the artificial intelligence component 215 for identifying the plurality of objects 220, the object boundary 225, and the data annotation 230. In an example, the artificial intelligence component 215 may convert each object from the plurality of objects 220 to an object image for identifying the object boundary 225 for each of the plurality of objects 220 by implementing the CNN based approach. The data annotation 230 may be an interpretation of a text or an image inside the object boundary 225 for each of the plurality of objects 220. The data segmenter 130 may determine a text context from the content record 205. The text context may refer to the interpretation of entire text segment of the content record 205 for processing the content creation requirement. In an example, the text context may be determined based on the data annotation 230 of the plurality of objects 220.

The image classifier 140 may determine an image context from the content record 205. The image context may refer to the interpretation of the entire image segment of the content record 205 for processing the content creation requirement. In an example, the image context may be determined based on the image data annotation 250 of the plurality of images 240. The image classifier 140 may process images present in the content record 205. The image classifier 140 may obtain the plurality of objects 220, the object boundary 225, and the data annotation 230 associated with each of the plurality of objects 220 from the data segmenter 130. The image classifier 140 may identify the plurality of images 240 from the plurality of objects 220 based on the data annotation 230. The plurality of images 240 may comprise various images segments from the content record 205. For example, if the data annotation 230 associated with an object from the plurality of objects 220 may indicate that there may an organization logo, a human face and the like present within the object boundary 225, the image classifier 140 may extract the same as an image. In an example, the content record 205 may include various images across the document, the same may be sorted as an object from the plurality of objects 220 and recognized by the image classifier 140 as an image for extraction and procession. Similarly, the image classifier 140 may extract all images from the content record 205 to form the plurality of images 240. The image classifier 140 may implement the first cognitive learning operation 235 (as described above) to segregate and annotate the plurality of images 240. The first cognitive learning operation 235 may be implemented to determine the image boundary 245 for each of the plurality of images 240. In an example, the image boundary 245 may be derived from the object boundary 225 after the removal of unwanted data (as described above). The first cognitive learning operation 235 may be implemented to determine the image data annotation 250 (described above) for each of the plurality of images 240.

The face classifier 150 may determine a face context from the content record 205. The face context may refer to the interpretation of the entire aesthetic segment of the content record 205 for processing the content creation requirement. In an example, the face context may be determined based on the exhibit annotation 270 of the plurality of exhibits 260. The face classifier 150 may process the display traits of the content record 205 including, but not limited to a content external link, content font information, content font-size information, content font style information, and content color information. The face classifier 150 may obtain the plurality of objects 220, the object boundary 225, and the data annotation 230 associated with each of the plurality of objects 220 from the data segmenter 130 for identifying the display traits of the content record 205. In an example, the display traits may constitute the plurality of exhibits 260. The second cognitive learning operation 255 may be implemented to determine the data pattern 265 associated with each of the plurality of exhibits 260. The data pattern 265 may be a set of display traits combines together into a pattern. The second cognitive learning operation 255 may be implemented (as described above) to determine the exhibit annotation 270 from the data pattern 265. The exhibit annotation 270 may include information regarding content external link, content font, content font size, content font style, and content color. For example, the exhibit annotation 270 may include information regarding which display traits may be associated with which object from the plurality of objects 220. In an example, the second cognitive learning operation 255 may be implemented to correlate the data pattern 265 associated with each of the plurality of exhibits 260 with the data annotation 230 associated with each of the plurality of objects 220 for determining a plurality of linkages amongst the plurality of objects 220 (described above).

The modeler 160 may process information obtained from the data segmenter 130, the image classifier 140, and the face classifier 150. In an example, the modeler 160 may obtain a text context pertaining to the content record 205 from the data segmenter 130 based on the data annotation 230 derived from the implementation of the artificial intelligence component 215. The modeler 160 may obtain an image context pertaining to the content record 205 from the image classifier 140 based on the image data annotation 250 derived from the implementation of the first cognitive learning operation 235. The modeler 160 may obtain a face context pertaining to the content record 205 from the face classifier 150 based on the exhibit annotation 270 derived from implementation of the second cognitive learning operation 255. The modeler 160 may create the content creation model 280 from evaluating the text context, the image context, and the face context as obtained from the evaluation of the plurality of objects 220, the plurality of images 240, and the plurality of exhibits 260. The content creation model 280 may include the content record 205 deconstructed into various segments with relevant text, images, external information links, display traits, and the like evaluated and presented to a user of the system 110. The modeler 160 may generate the content creation output 285 comprising the content creation model 280 to resolve the content creation requirement. The content creation model 280 including the content record 205 assembled in a data layout 290 for resolving the content creation requirement. In an example, the content creation output 285 may include the content record 205 aligned into an HTML based format for generating electronic mails based on the content record 205 for executing sales and marketing operations of an organization. The modeler 160 may compare the data layout 290 from the content creation model 280 with the data layout 290 from the content record 205 to identify a deviation. The modeler 160 may rectify the deviation by implementing the third cognitive learning operation 275.

In accordance with various embodiments of the present disclosure, the modeler 160 may identify the errors in the generation. This process may be done through the deployment of the image processing techniques, identifying the segments from the images from the content record 205 and the content creation model 280. A comparison may be made by identifying a number of segments and then skeleton the same across the two corresponding images from the content record 205 and the content creation model 280. This may identify a percentage of layout matches. The layout across both the images will then be used to compare more granular features like the buttons, URLs, font style, size across different words and/or segments. For example, the modeler 160 may convert the content record 205 and content creation model 280 into a page by page images. The modeler 160 may identify the object boundary 225 of the content record 205 and the object boundary 225 of the content creation model 280 page by page images. The modeler 160 may create and compare the corresponding page by page images after applying gradient morphing and similar filters. In an example, the object boundary 225 of the content record 205 and the object boundary 225 of the content creation model 280 may be cropped for both the images and corresponding style features of each of the object boundary 225 may be extracted with the help of information from each pixel of each image. In an example, the modeler 130 may deploy the image cropping techniques mentioned above for cropping the object boundary 225. The modeler may compare the style features of each object with the style of corresponding object in the content creation model 280. The location of the difference, in terms of a segment and page number as well as the co-ordinates may be identified. The modeler 160 may identify the type of difference, for example, font-style, font-size, image-style, image-size, button-style, button-location, segment-background, button-background, URL, and the like. The modeler 160 may determine the values of the differences as identified from the content record 205 may return the same as a result to the user (illustrated by way of FIG. 8).

As mentioned above, the modeler 160 may implement the third cognitive learning operation 275 for rectifying the content deviation to determine an updated content creation model 280. The modeler 160 may implement the third cognitive learning operation 275 for updating the content deviation and a corresponding rectification for a future reference. Such future references may enable a self-learning module of the modeler 160. The self-learning module may be a continuous learning module where the identified difference may be automatically corrected by the system 110. This would improve the accuracy of the entire system 110 and create a no human intervention-based system for content alignment. The self-learning module may assess the page by page differences between the content record 205 and the content creation model 280 as identified by the third cognitive learning operation 275 as described above. The modeler 160 may identify the type of difference, for example, font-style, font-size, image-style, image-size, button-style, button-location, segment-background, button-background, URL, and the like. The modeler 160 may determine the values of the differences as identified from the content record 205 may return the same as a result to the user. In an example, the HTML Document Object Model (DOM) may be parsed to identify a corresponding TR/TD section using the segment, page number and the coordinates of the location of segment. The DOM may be a programming code for HTML and XML™ documents. The DOM may define a logical structure of documents and the way a document is accessed and manipulated. The corresponding features of the different styles including the size, style may be extracted as described above. The features may be updated as per the values identified in the page by page image of the content record 205 as mentioned above. The HTML DOM may be rebuilt with the updated information to give the self-corrected content creation output 285. The Self-corrected/human corrected content creation output 285 files may be saved in a database for future learning. The modeler 160 may also update the content creation output 285 files based on content record 205s corrected or verified by a human user and saved in the database. In an example, a layout similarity metric may be developed to identify the similarity between a new content record 205 and the content record 205 documents in the database. If a content record 205 document with high similarity in the layout exists, the content record 205 documents from the database may be presented to the user to choose so that the time required for regenerating the content record 205 as well as assessing the quality of the resultant content creation model 280 is greatly reduced. Since these documents have already been reviewed by a human, the accuracy of the generated output may be increased.

The embodiments for the artificial intelligence component 215, the first cognitive learning operation 235, the second cognitive learning operation 255, and the third cognitive learning operation 275 presented herein are exemplary in nature and should be treated as such. For the sake of brevity and technical clarity, the description of the content alignment system may be restricted to few exemplary embodiments, however, to a person skilled in the art it should be clear that the system might be used for the fulfillment of various content alignment requirements other than those mentioned hereinafter.

Figure 3:
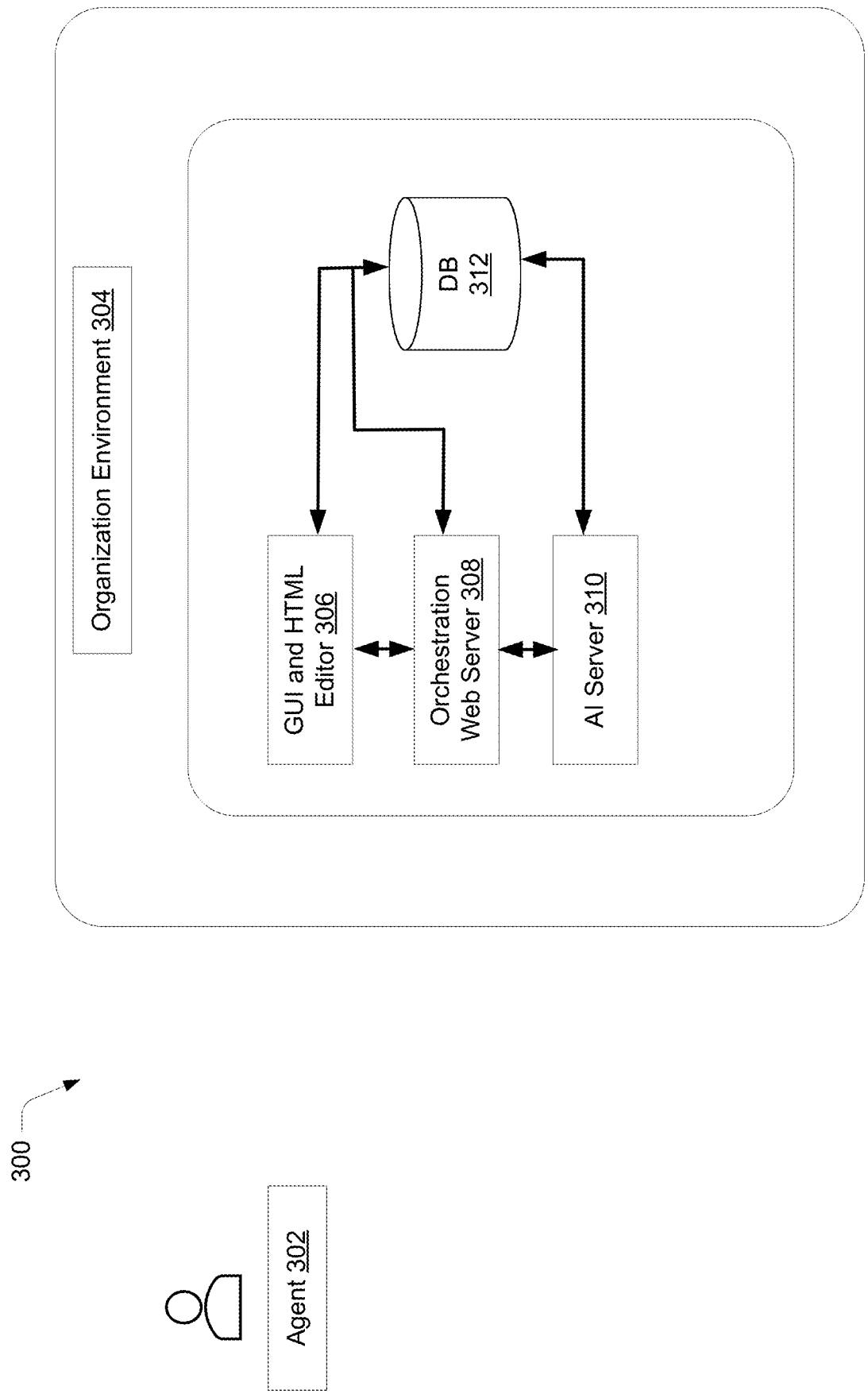
FIG. 3 illustrates a network architectural diagram of a content alignment system, according to an example embodiment of the present disclosure.

FIG. 3 illustrates a network architectural diagram of a system 300 of a content alignment system, according to an example embodiment of the present disclosure. The system 300 may deploy any of the components of the system 110 as mentioned by FIG. 1 and FIG. 2. For the sake of brevity, and technical clarity the components of the system 110 may not be repeated hereinafter, but references to the same may be given. The system 300 may illustrate an overall architecture of the system 110 and a role of the artificial intelligence component 215, the first cognitive learning operation 235, the second cognitive learning operation 255, and the third cognitive learning operation 275 in content alignment using the system 110. The system 300 may include an agent 302 and an organization environment 304. The agent 302 may be a user of the system 110. The agent 302 may receive, for example, a PDF® file, an Excel® file, a PSD® file to create the HTML files from the organization environment 304. In an example, the PDF® file, the Excel® file, the PSD® file may be are created by a creative team from the organization environment 304 and may include identified images, content, and layout of the email to be sent out for sales and marketing operation. The system 300 may improve the efficiency and effectiveness of the agent 302 by capturing the layout as well as style features into a structured format.

The organization environment 304 may include a database 312. The database 312 may comprise various files such as the PDF® file, the Excel® file, the PSD® file. The organization environment 304 may further include an HTML editor 306, an orchestration web server 308, and an AI server 310. The HTML editor 306 may include a graphical user interface from where the agent 302 may interact with other components of the system 300 and the organization environment 304. The orchestration web server 308 may be an automated arrangement for coordination, and management of complex computer systems, and services with the organization environment 304. The AI server 310 may host the artificial intelligence component 215, the first cognitive learning operation 235, the second cognitive learning operation 255, and the third cognitive learning operation 275.

The HTML editor 306, the orchestration web server 308, and the AI server 310 may deploy various algorithms developed for extracting the text context, the image context, and the face context from the PDF® file, the Excel® file, the PSD® file. In an example, a structured JSON format may be deployed for presenting the extracted information with captures style as well as the segments to the user 302 through the HTML editor 306. In an example, depending on the type of the segment, the HTML editor 306 may generate an HTML file for an entire design given by the content record 205. The AI server 310 may target to generate the email in an automated manner (described in further detail by way of FIG. 4).

Figure 4:
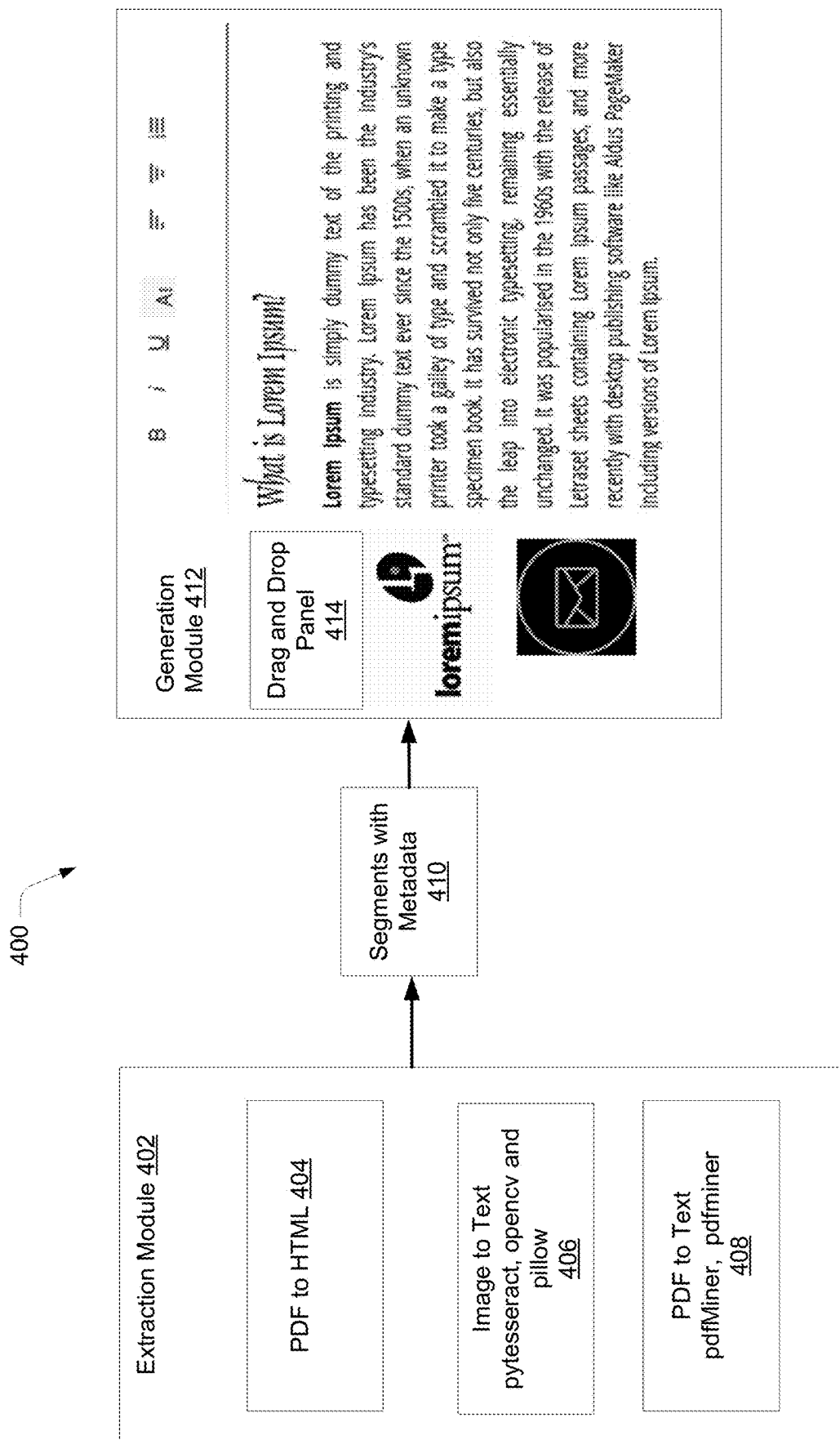
FIG. 4 illustrates a network architectural diagram of an artificial intelligence-based extraction and generation module of a content alignment system, according to an example embodiment of the present disclosure.

FIG. 4 illustrates a network architectural diagram of a system 400 of an artificial intelligence-based extraction and generation module of a content alignment system, according to an example embodiment of the present disclosure. The system 400 may deploy any of the components of the system 110 as mentioned by FIG. 1, FIG. 2 and FIG. 3. For the sake of brevity, and technical clarity the components of the system 110 may not be repeated hereinafter, but references to the same may be given. In an example, the system 400 may be the AI server 310.

The system 400 may include an extraction module 402, and a generation module 412. The extraction module 402 may include a PDF® to HTML module 404, an image to text module 406, and a PDF® to text module 408. The PDF® to text module 408 may implement any of the artificial intelligence component 215 techniques described by way of FIG. 2 for example, the CNN based approach, and the machine learning-based approach for determining the text context from the content record 205. The image to text module 406 may implement the first cognitive learning operation 235 and deploying techniques for the same as described by way of FIG. 2 for determining the image context from the content record 205. The PDF® to HTML module 404 may implement the second cognitive learning operation 255 and deploying techniques for the same as described by way of FIG. 2 for determining the face context from the content record 205. The extraction module 402 may host the artificial intelligence component 215, the first cognitive learning operation 235, the second cognitive learning operation 255. The extraction module 402 may generate an output comprising the text context, the image context, and the face context of the content record 205. The extraction module 402 may provide the generated output to a metadata module 410. The metadata module 410 may link the text context, the image context, and the face context of the content record 205 through the plurality of linkages as described by way of FIG. 2 using the data annotation 230, the image data annotation 250, and the exhibit annotation 270. The metadata module 410 may provide an input for the generation module 412. The generation module 412 may host the third cognitive learning operation 275. The generation module 412 may include a drag and drop panel 414. The drag and drop panel 414 may be designed to implement the third cognitive learning operation 275 for the generation of the content creation model 280 as described by way of FIG. 2. In an example, the drag and drop panel 414 may implement the third cognitive learning operation 275 and deploying techniques for the same as described by way of FIG. 2 for determining the content creation model 280. In an example, the user of the system 400 may change the content creation output 285 generated by the content creation model 280 by moving various segments and creating a new data layout 290. The user may decide on the best content creation output 285 based on the content creation model 280 generated by the drag and drop panel 414. In an example, the drag and drop panel 414 may be coupled to the HTML editor 306 for providing the graphical interface to the user for moving various segments and creating the content creation output 285.

Figure 5A:
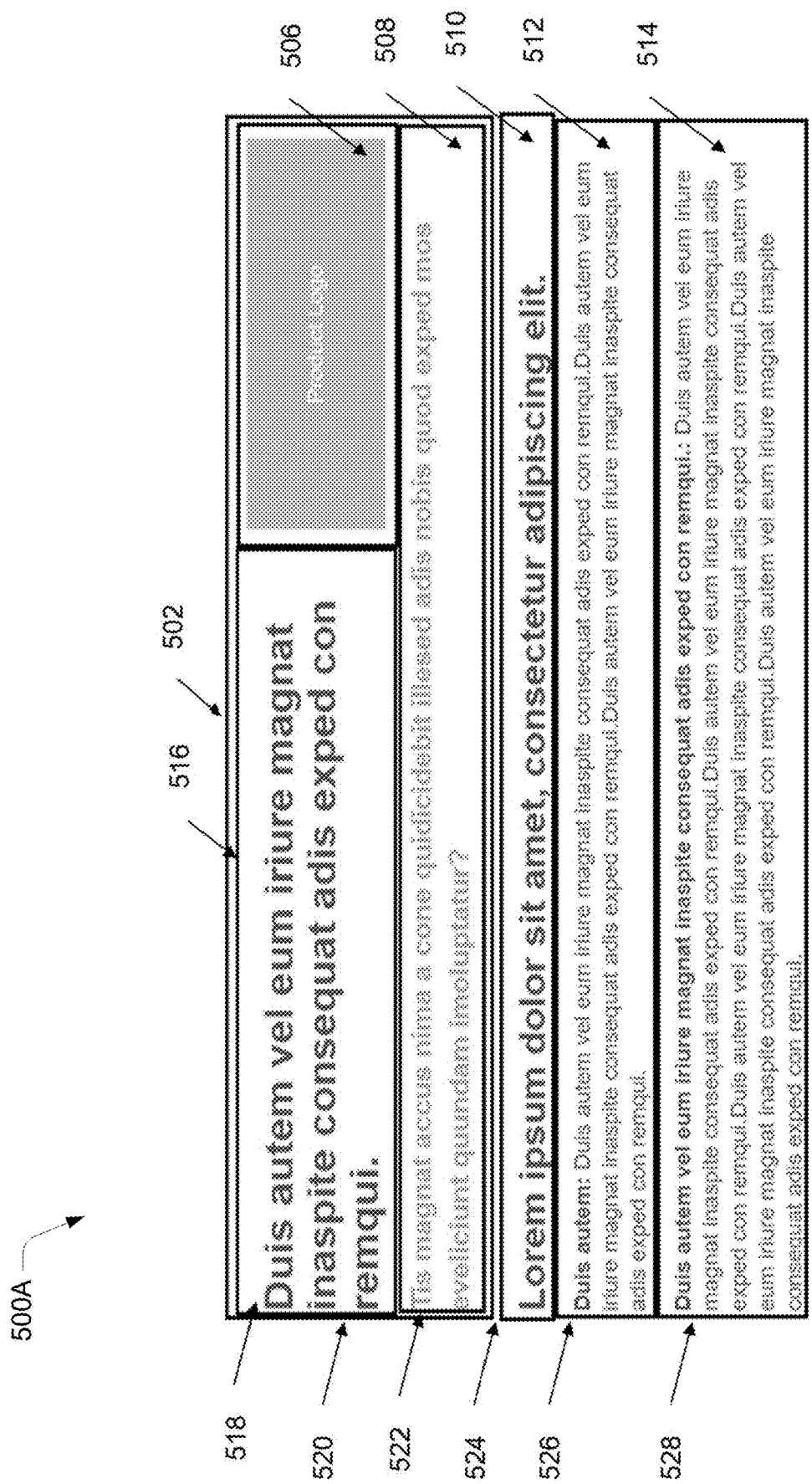
FIG. 5A illustrates a pictorial representation of the extraction of an image for content alignment using a content alignment system, according to an example embodiment of the present disclosure.

FIG. 5A illustrates a pictorial representation 500A of extraction of an image for content alignment using a content alignment system, according to an example embodiment of the present disclosure. The pictorial representation 500A may deploy any of the components of the system 110 as mentioned by FIG. 1, FIG. 2, FIG. 3 and FIG. 4. For the sake of brevity, and technical clarity the components of the system 110 may not be repeated hereinafter, but references to the same may be given. The pictorial representation 500A may illustrate a content record segment 502. The content system 110 may implement the artificial intelligence component 215 (as described by way of FIGS. 1-4) on the content record segment 502 to identify an object 506, an object 508, an object 510, an object 512, an object 514, and an object 518. The object 506, the object 508, the object 510, the object 512, the object 514, and the object 518 may constitute the plurality of objects 220. In the pictorial representation 500A the object 506, the object 508, the object 510, the object 512, the object 514, and the object 518 may be processed by deploying the machines learning approach as mentioned by way of FIG. 2. In the pictorial representation 500A, the object 506 may be an image, for example, an organization logo and may be processed accordingly as mentioned by way of FIG. 2 for determination of the image data annotation 250. The content system 110 may implement the artificial intelligence component 215 (as described by way of FIGS. 1-4) on the content record segment 502 to identify an object boundary 516, an object boundary 520, an object boundary 522, an object boundary 524, an object boundary 526, and an object boundary 528. In an example, the object boundary 516, the object boundary 520, the object boundary 522, the object boundary 524, the object boundary 526, and the object boundary 528 may be the object boundary 225. The system 110 may determine a text context and an image context from the object 506, the object 508, the object 510, the object 512, the object 514, and the object 518 based on the object boundary 516, the object boundary 520, the object boundary 522, the object boundary 524, the object boundary 526, and the object boundary 528.

Figure 5B:
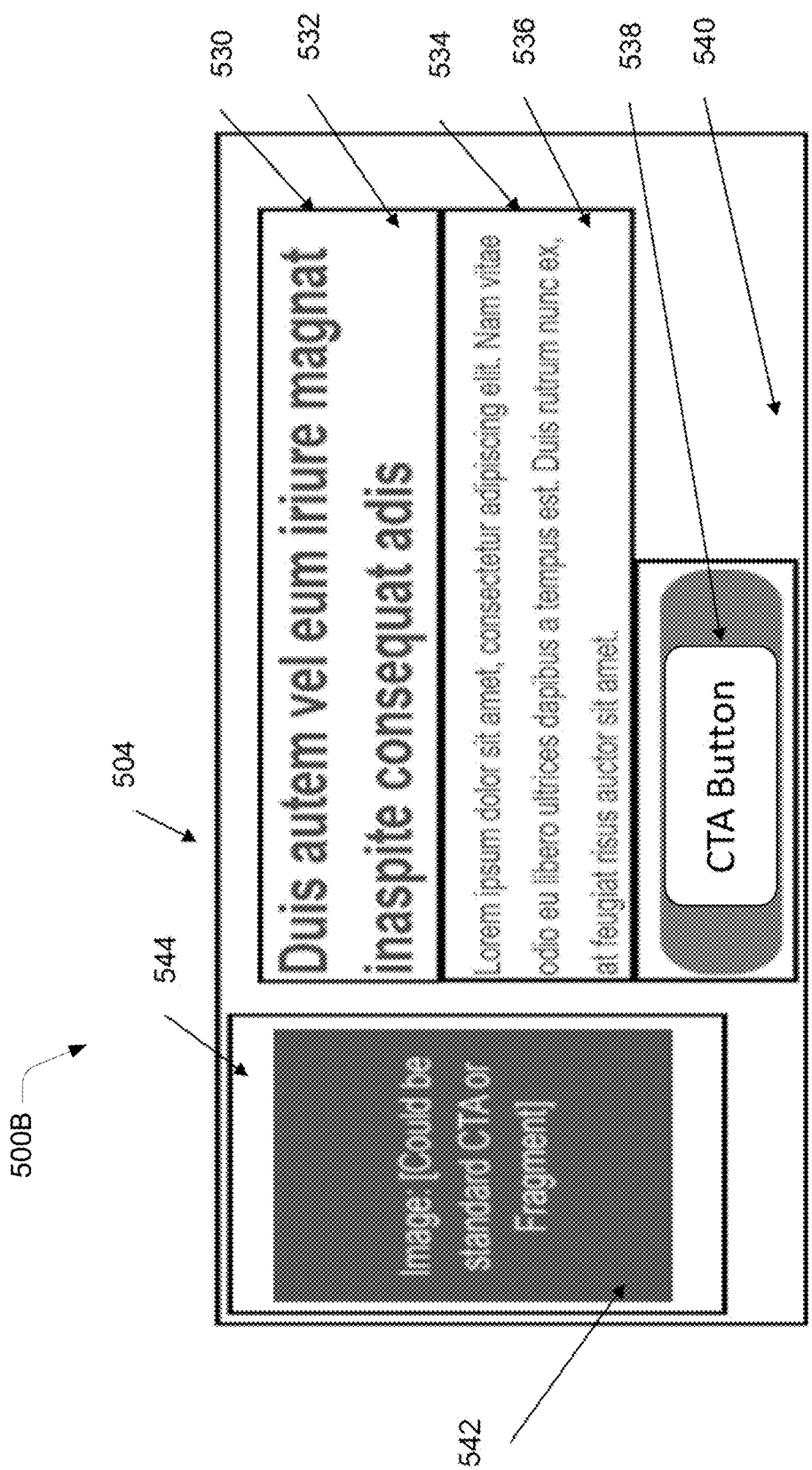
FIG. 5B illustrates a pictorial representation of the extraction of an image for content alignment using a content alignment system, according to an example embodiment of the present disclosure.

FIG. 5B illustrates a pictorial representation 500 of extraction of an image for content alignment using a content alignment system, according to an example embodiment of the present disclosure. The pictorial representation 500B may deploy any of the components of the system 110 as mentioned by FIG. 1, FIG. 2, FIG. 3 and FIG. 4. For the sake of brevity, and technical clarity the components of the system 110 may not be repeated hereinafter, but references to the same may be given. The pictorial representation 500B may illustrate a content record segment 504. The content system 110 may implement the artificial intelligence component 215 (as described by way of FIGS. 1-4) on the content record segment 502 to identify an object 532, an object 536, an object 538, and an object 542. In an example, the object 532, the object 536, the object 538, and the object 542 may constitute the plurality of objects 220. In the pictorial representation 500B, the object 532, the object 536, the object 538, and the object 542 may be converted to images by the artificial intelligence component 215 may be processed using the CNN based approach as mentioned by way of FIG. 2. The content system 110 may implement the artificial intelligence component 215 (as described by way of FIGS. 1-4) on the content record segment 504 to identify an object boundary 530, an object boundary 534, an object boundary 540, an object boundary 544. In an example, the object boundary 530, the object boundary 534, the object boundary 540, the object boundary 544 may be the object boundary 225. The system 110 may determine a text context and an image context from the object 532, the object 536, the object 538, and the object 542 based on the object boundary 225 530, the object boundary 225 534, the object boundary 225 540, the object boundary 225 544.

Figure 6A:
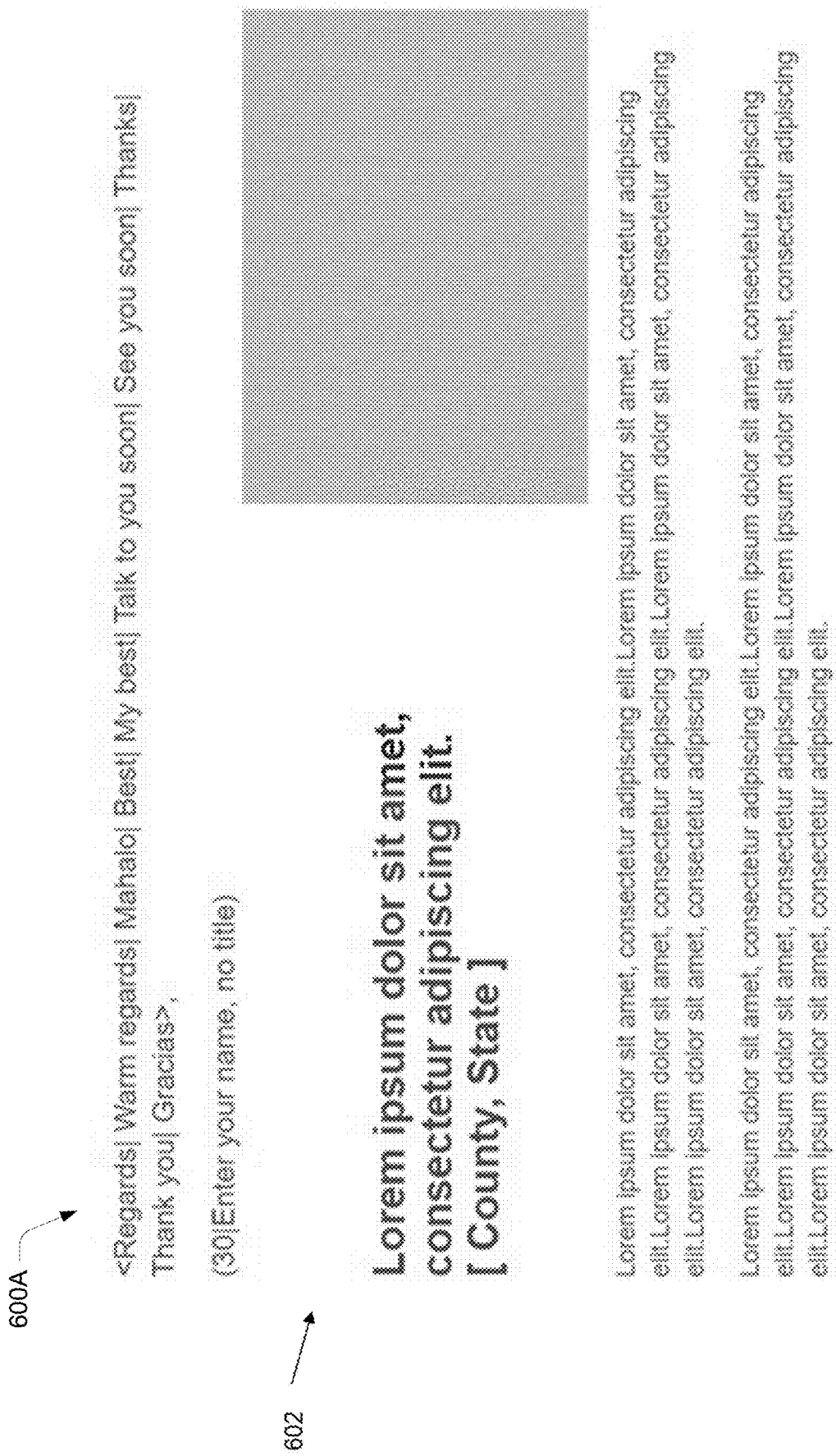
FIG. 6A illustrates a pictorial representation of a content record deployed by a content alignment system, for content alignment according to an example embodiment of the present disclosure.

FIG. 6A illustrates a pictorial representation of content record 205 deployed by a content alignment system, for content alignment according to an example embodiment of the present disclosure. The pictorial representation 600A may deploy any of the components of the system 110 as mentioned by FIG. 1, FIG. 2, FIG. 3, FIG. 4, FIG. 5A, and FIG. 5B. For the sake of brevity, and technical clarity the components of the system 110 may not be repeated hereinafter, but references to the same may be given. The pictorial representation 600A may illustrate a content record 602. The content record 602 may be the same as the content record 205 described by way of FIG. 2. The content record 602 may be an exemplary embodiment of the content record 205. In the pictorial representation 600A, the content record 602 may be a PDF® file.

Figure 6B:
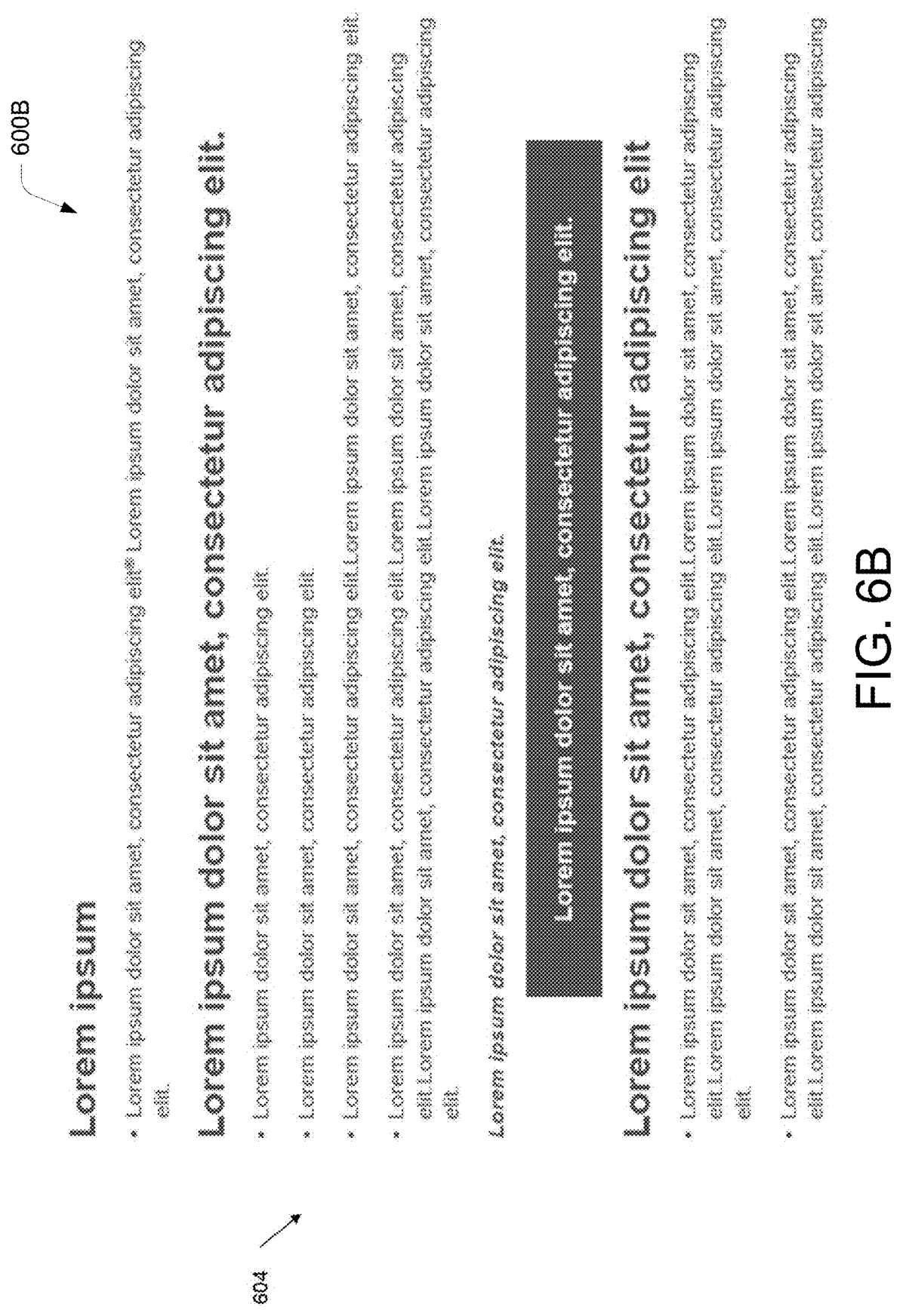

FIG. 6B illustrates a pictorial representation of a sample data from a content record 205 deployed by a content alignment system, for content alignment according to an example embodiment of the present disclosure. The pictorial representation 600B may deploy any of the components of the system 110 as mentioned by FIG. 1, FIG. 2, FIG. 3, FIG. 4, FIG. 5A, and FIG. 5B. For the sake of brevity, and technical clarity the components of the system 110 may not be repeated hereinafter, but references to the same may be given. The pictorial representation 600B may illustrate a sample data 604. The sample data 604 may be determined from the content record 602 as shown by the pictorial representation 600A, upon implementation of the artificial intelligence component 215, the first cognitive learning operation 235, and the second cognitive learning operation 255 as mentioned by way of FIG. 2

FIG. 6C illustrates a pictorial representation of a content creation output 285 generated by deploying a content alignment system, according to an example embodiment of the present disclosure. The pictorial representation 600C may deploy any of the components of the system 110 as mentioned by FIG. 1, FIG. 2, FIG. 3, FIG. 4, FIG. 5A, and FIG. 5B. For the sake of brevity, and technical clarity the components of the system 110 may not be repeated hereinafter, but references to the same may be given. The pictorial representation 600C may illustrate a content creation output 285 606 for the content record 602. The system 110 may implement the third cognitive learning operation 275 on the sample data 604 fora generation of the content creation output 606. In an example, the content creation output 606 may be an exemplary embodiment of the content creation output 285.

Figure 7A:
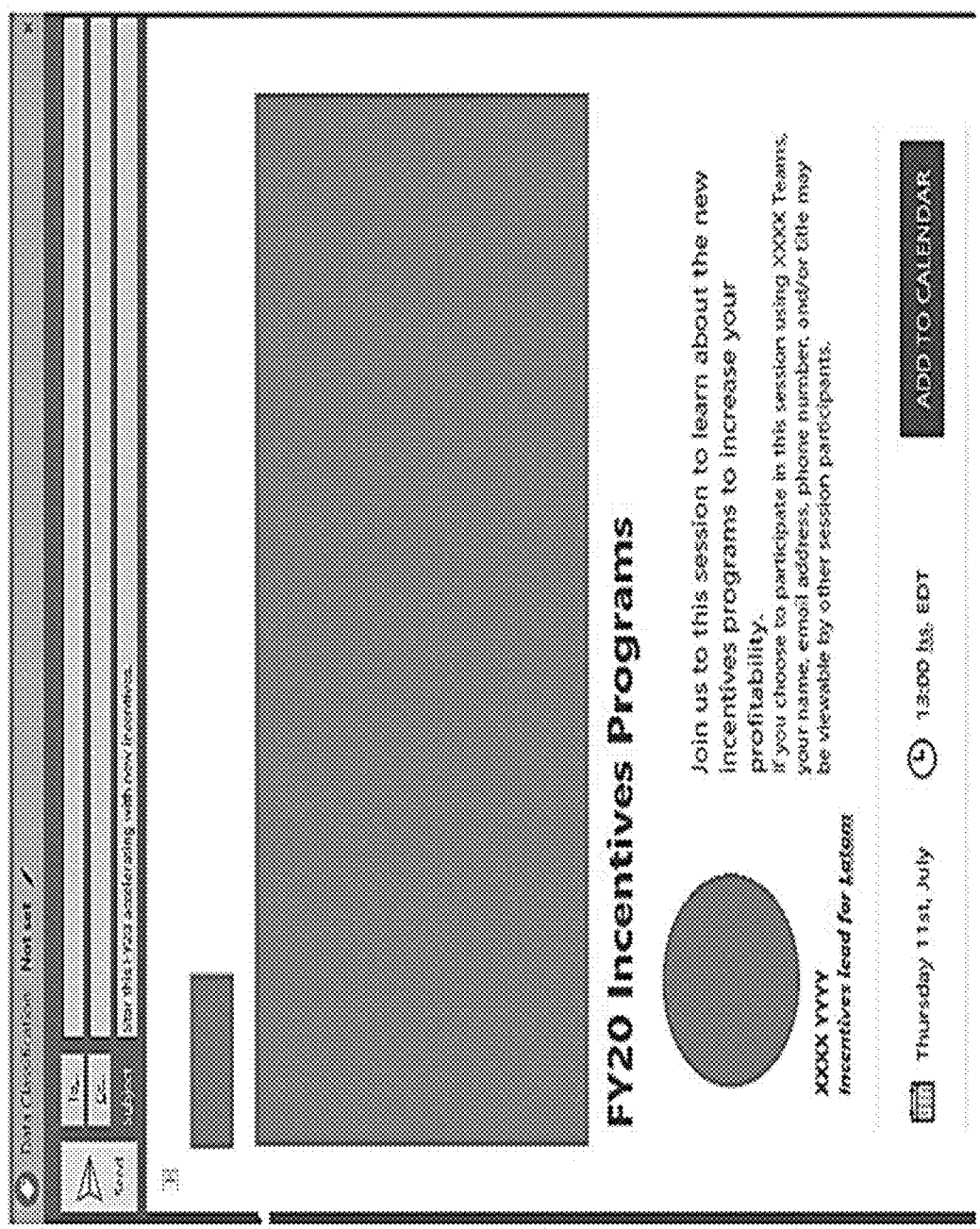
FIG. 7A illustrates a pictorial representation of a content alignment system, at a content record input stage, according to an example embodiment of the present disclosure.

FIG. 7A illustrates a pictorial representation 700A of a content alignment system, at a content record input stage, according to an example embodiment of the present disclosure. The pictorial representation 700A may deploy any of the components of the system 110 as mentioned by FIG. 1, FIG. 2, FIG. 3, FIG. 4, FIG. 5A, FIG. 5B, FIG. 6A, FIG. 6B, and FIG. 6C. For the sake of brevity, and technical clarity the components of the system 110 may not be repeated hereinafter, but references to the same may be given. The pictorial representation 700A may illustrate a content record 702. The content record 702 may be the same as the content record 205 described by way of FIG. 2. The content record 702 may be an exemplary embodiment of the content record 205. In the pictorial representation 700A the content record 702 may be an OFT® file.

FIG. 7B illustrates a pictorial representation 700B of a content creation output 285 generated by deploying the content alignment system 110, according to an example embodiment of the present disclosure. The pictorial representation 700B may deploy any of the components of the system 110 as mentioned by FIG. 1, FIG. 2, FIG. 3, FIG. 4, FIG. 5A, FIG. 5B, FIG. 6A, FIG. 6B, FIG. 6C, and FIG. 7A. For the sake of brevity, and technical clarity the components of the system 110 may not be repeated hereinafter, but references to the same may be given. The pictorial representation 700B may illustrate a content creation output 704 for the content record 702. The system 110 may implement the artificial intelligence component 215, the first cognitive learning operation 235, the second cognitive learning operation 255, and the third cognitive learning operation 275 on the content record 702 for a generation of the content creation output 704. In an example, the content creation output 704 may be an exemplary embodiment of the content creation output 285.

FIG. 8 illustrates a pictorial representation 800 of a comparison between a content record 205 and a content creation output 285 by deploying a content alignment system, according to an example embodiment of the present disclosure. The pictorial representation 800 may deploy any of the components of the system 110 as mentioned by FIG. 1, FIG. 2, FIG. 3, FIG. 4, FIG. 5A, FIG. 5B, FIG. 6A, FIG. 6B, FIG. 6C, FIG. 7A, and FIG. 7B. For the sake of brevity, and technical clarity the components of the system 110 may not be repeated hereinafter, but references to the same may be given. The pictorial representation 800 may illustrate a content record 802 and a content creation result 804. As mentioned above, the modeler 160 may compare the content creation model 280 with the content record 205 for identifying a content deviation to validate the content creation model 280. The pictorial representation 800 may illustrate a comparison between the content creation model 280 with the content record 802. The content record 802 may include an object 810 comprising a "black" color background overlaid with a "white" color text. The content creation model 280 may include an object 812 comprising a "black" color background overlaid with a "black" color text. The modeler 160 may identify the deviation in text color from the object 810 of the content record 205 with the object 812 of the content creation model 280. The modeler 160 may highlight the deviation with a deviation marker 806 in the content record 205 and a deviation marker 808 in the content creation model 280 by the implementation of the third cognitive learning operation 275 as described in detail by way of FIG. 2. The deviation marker 806 and the deviation marker 808 may facilitate a user in identifying the content deviation. Additionally, the modeler 160 may implement the third cognitive learning operation 275 for rectifying the content deviation to determine an updated content creation model 280 as explained in detail by way of FIG. 2.

Figure 9A:
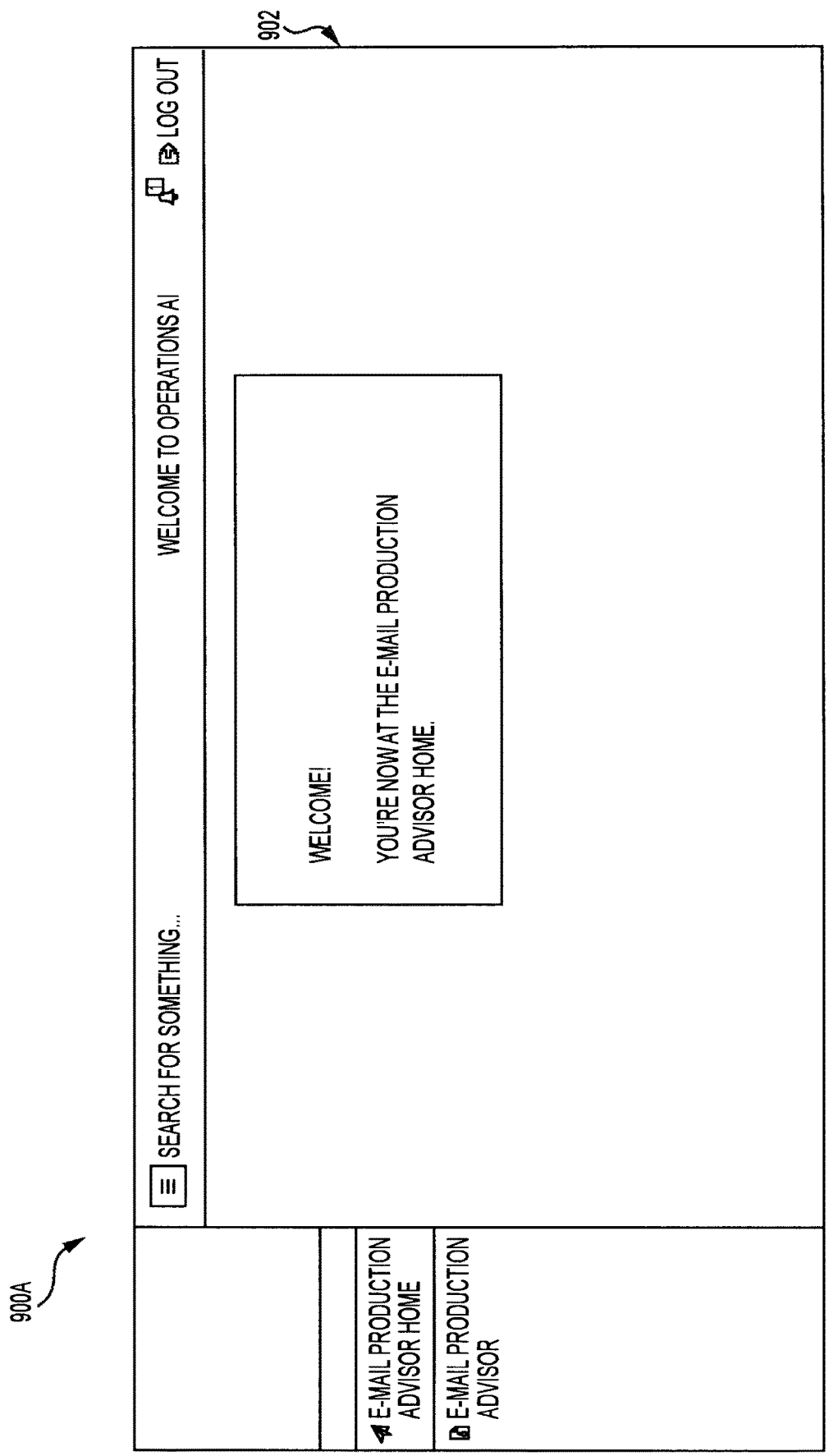
Figure 9B:
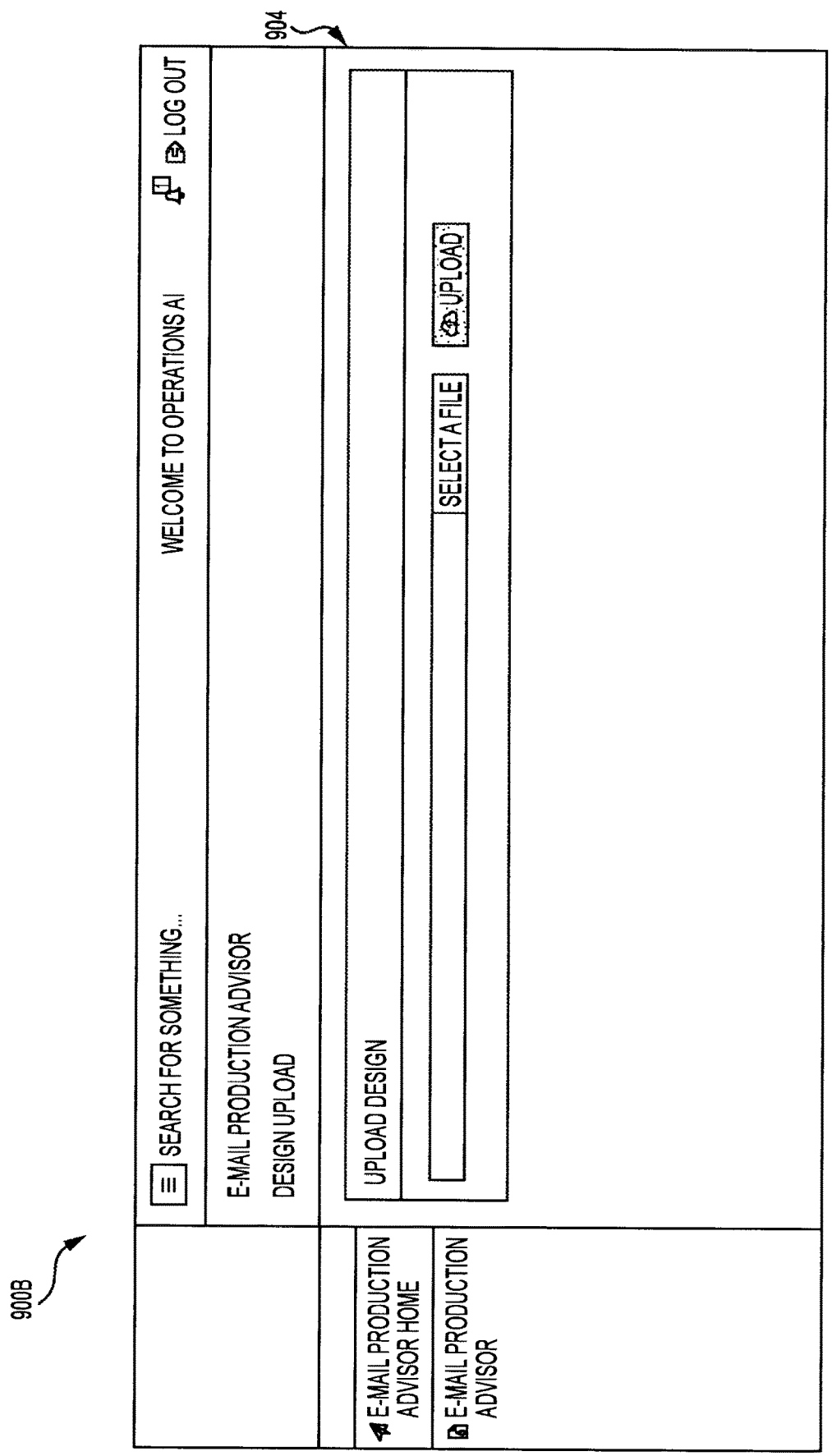
Figure 9C:
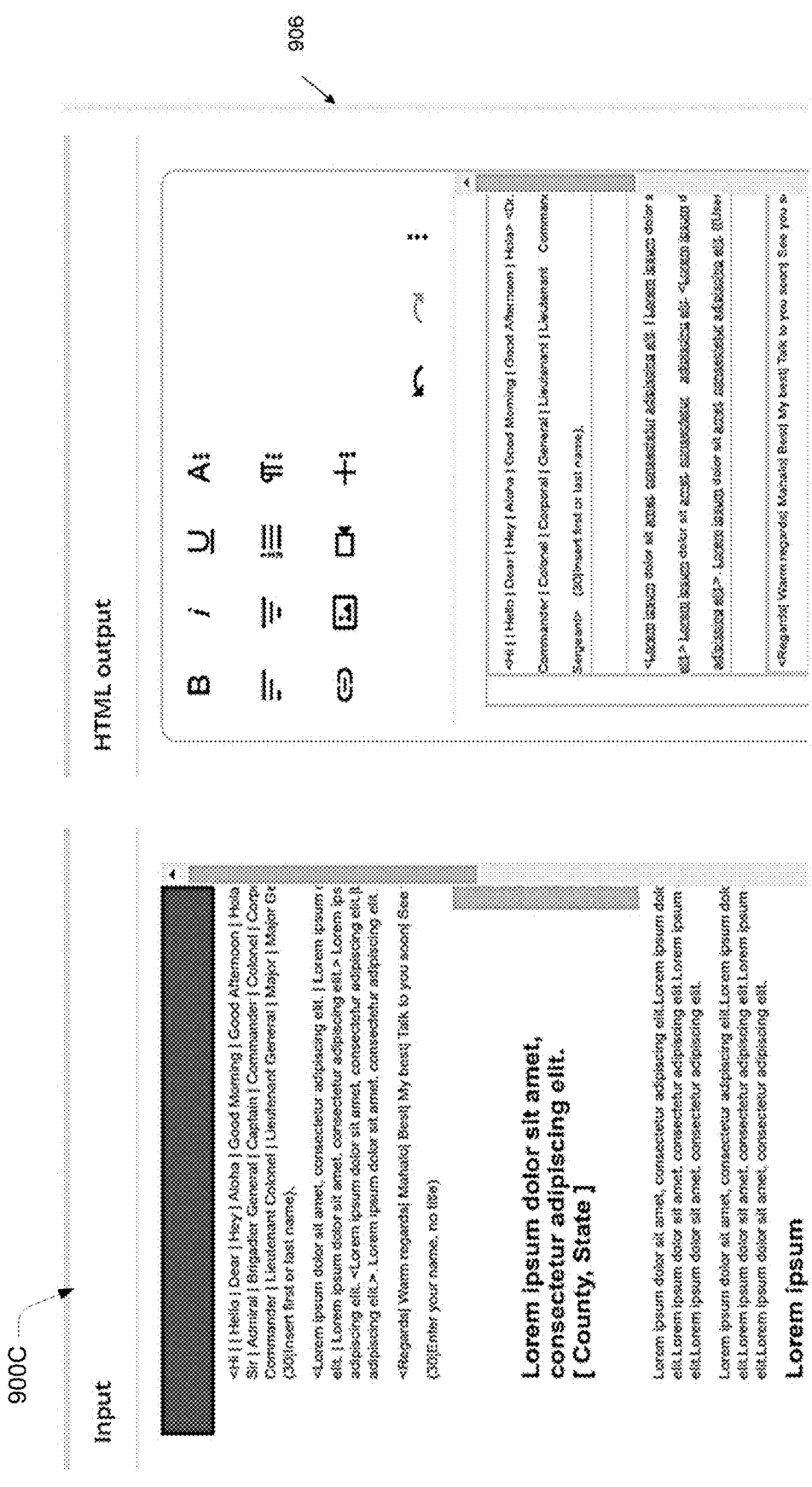

FIGS. 9A-9D illustrates a pictorial representation of a content alignment system, according to an example embodiment of the present disclosure. Any of the components of the system 110 as mentioned by FIG. 1, FIG. 2, FIG. 3, FIG. 4, FIG. 5A, FIG. 5B, FIG. 6A, FIG. 6B, FIG. 6C, FIG. 7A, FIG. 7B and FIG. 8 may be deployed for executing the steps illustrated by FIGS. 9A-9D. For the sake of brevity, and technical clarity the components of the system 110 may not be repeated hereinafter, but references to the same may be given. FIG. 9A may illustrate a graphical user interface 902 of the system 110. FIG. 9B may illustrate a content record 205 receiving component of the system 110. FIG. 9C may illustrate the content creation model 280 as compared with the content record 205. FIG. 9D may illustrate a comparison 906 between the content record 205 and the content creation output 285 for determining the content deviation as described by way of FIG. 8.

Figure 10:
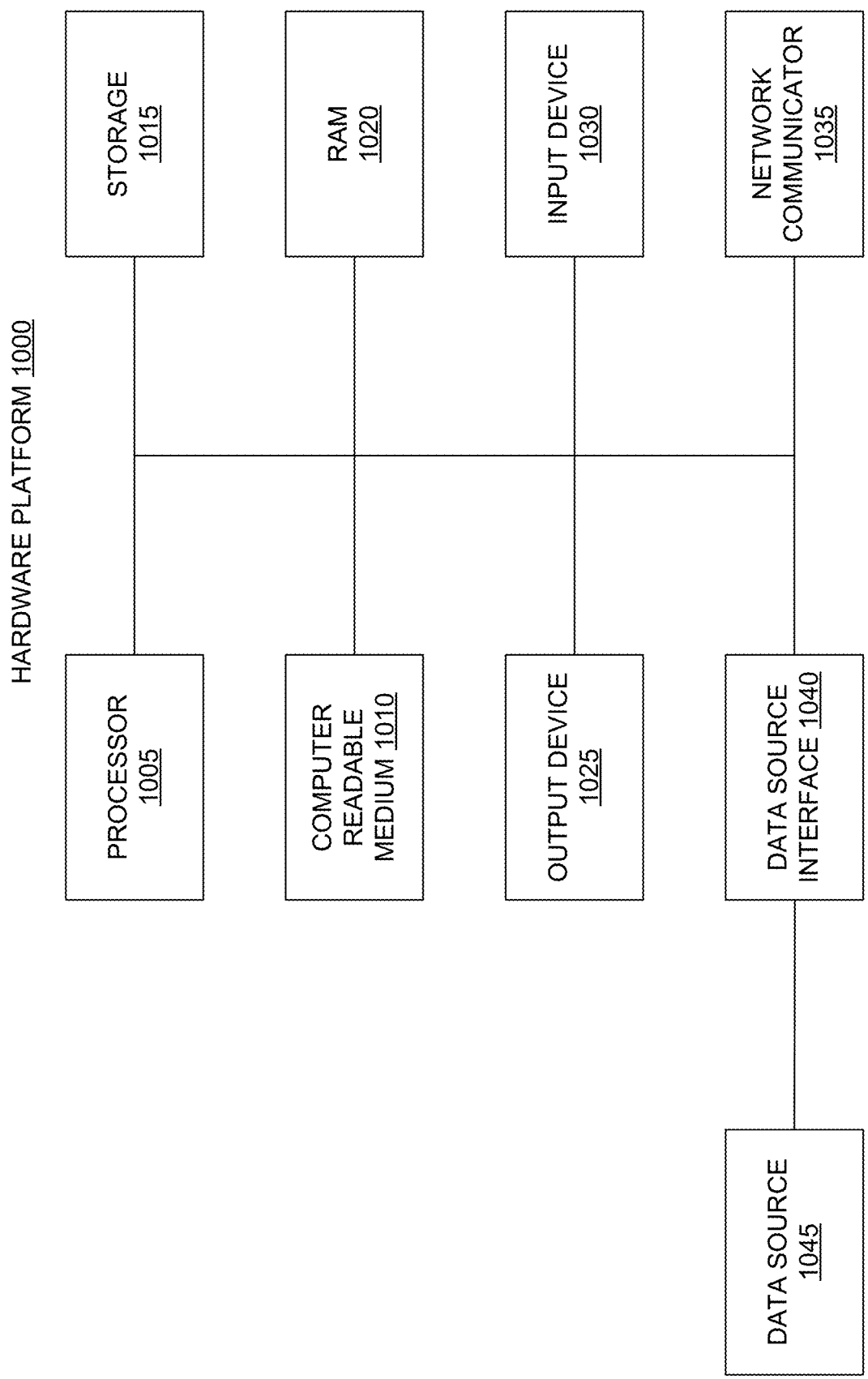
FIG. 10 illustrates a hardware platform for the implementation of a content alignment system, according to an example embodiment of the present disclosure.

FIG. 10 illustrates a hardware platform 1000 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1000. The hardware platform 1000 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 10, the hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1000 may include a processor 1005 that executes software instructions or code stored on a non-transitory computer-readable storage medium 1010 to perform methods of the present disclosure. The software code includes, for example, instructions to gather data and documents and analyze documents. In an example, the data segmenter 130, the image classifier 140, the face classifier 150, and the modeler 160 may be software codes or components performing these steps.

The instructions on the computer-readable storage medium 1010 are read and stored the instructions in storage 1015 or in random access memory (RAM) 1020. The storage 1015 provides a large space for keeping static data where at least some instructions could be stored for later execution. The stored instructions may be further compiled to generate other representations of the instructions and dynamically stored in the RAM 1020. The processor 1005 reads instructions from the RAM 1020 and performs actions as instructed.

The computer system 1000 further includes an output device 1025 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1000 further includes input device 1030 to provide a user or another device with mechanisms for entering data and/or otherwise interact with the computer system 1000. The input device may include, for example, a keyboard, a keypad, a mouse, or a touchscreen. In an example, the output of the hypothesis generator 140 and the modeler 160 150 may be displayed on the output device 1025. Each of these output devices 1025 and input devices 1030 could be joined by one or more additional peripherals. In an example, the output device 1025 may be used to display the results of the content creation requirement 210.

A network communicator 1035 may be provided to connect the computer system 1000 to a network and in turn to other devices connected to the network including other clients, servers, data stores, and interfaces, for instance. A network communicator 1035 may include, for example, a network adapter such as a LAN adapter or a wireless adapter. The computer system 1000 includes a data source interface 1040 to access data source 1045. A data source is an information resource. As an example, a database of exceptions and rules may be a data source. Moreover, knowledge repositories and curated data may be other examples of data sources.

Figure 11A:
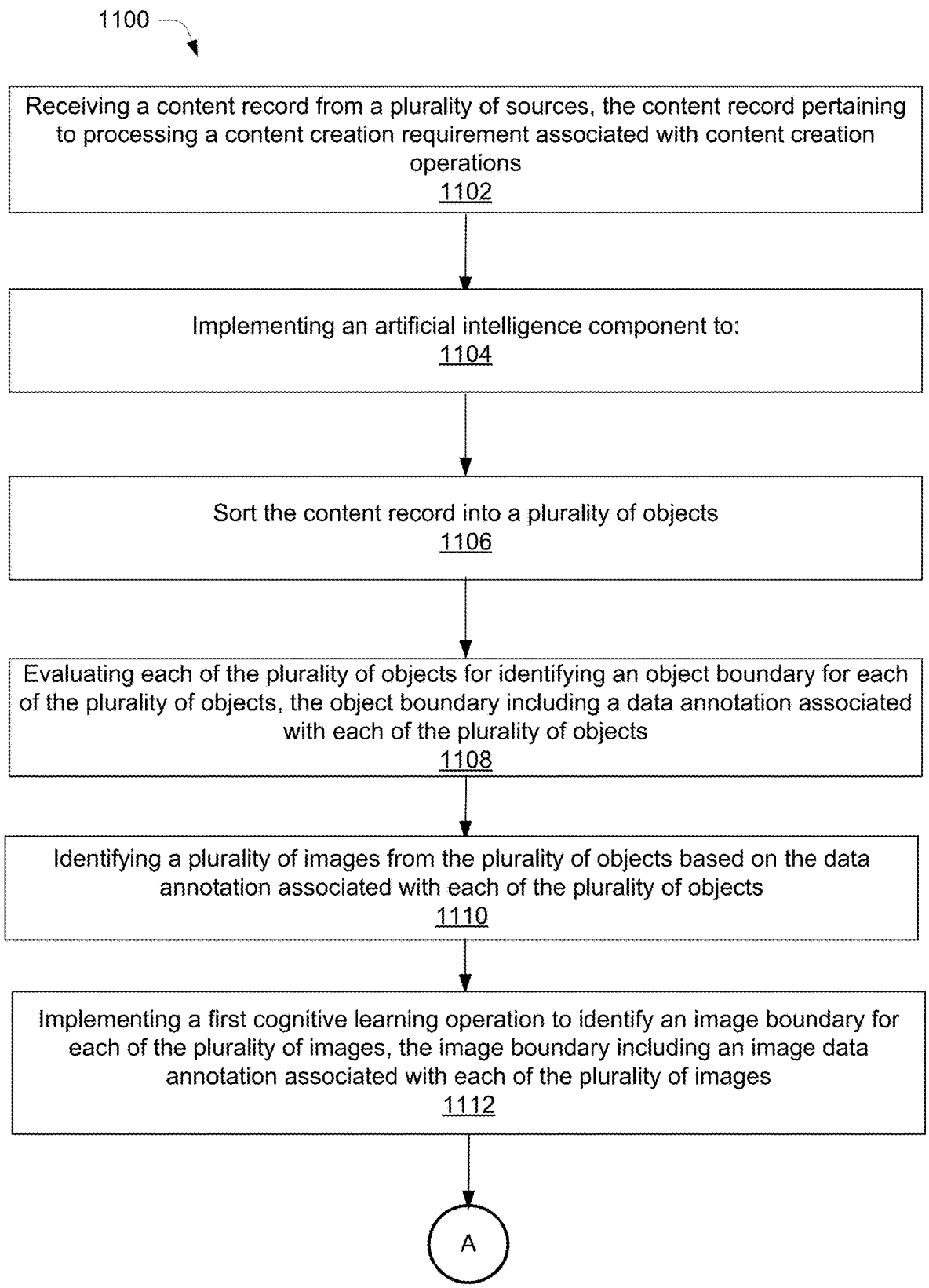
FIGS. 11A and 11B illustrate a process flowchart for content alignment using a content alignment system, according to an example embodiment of the present disclosure.
Figure 11B:
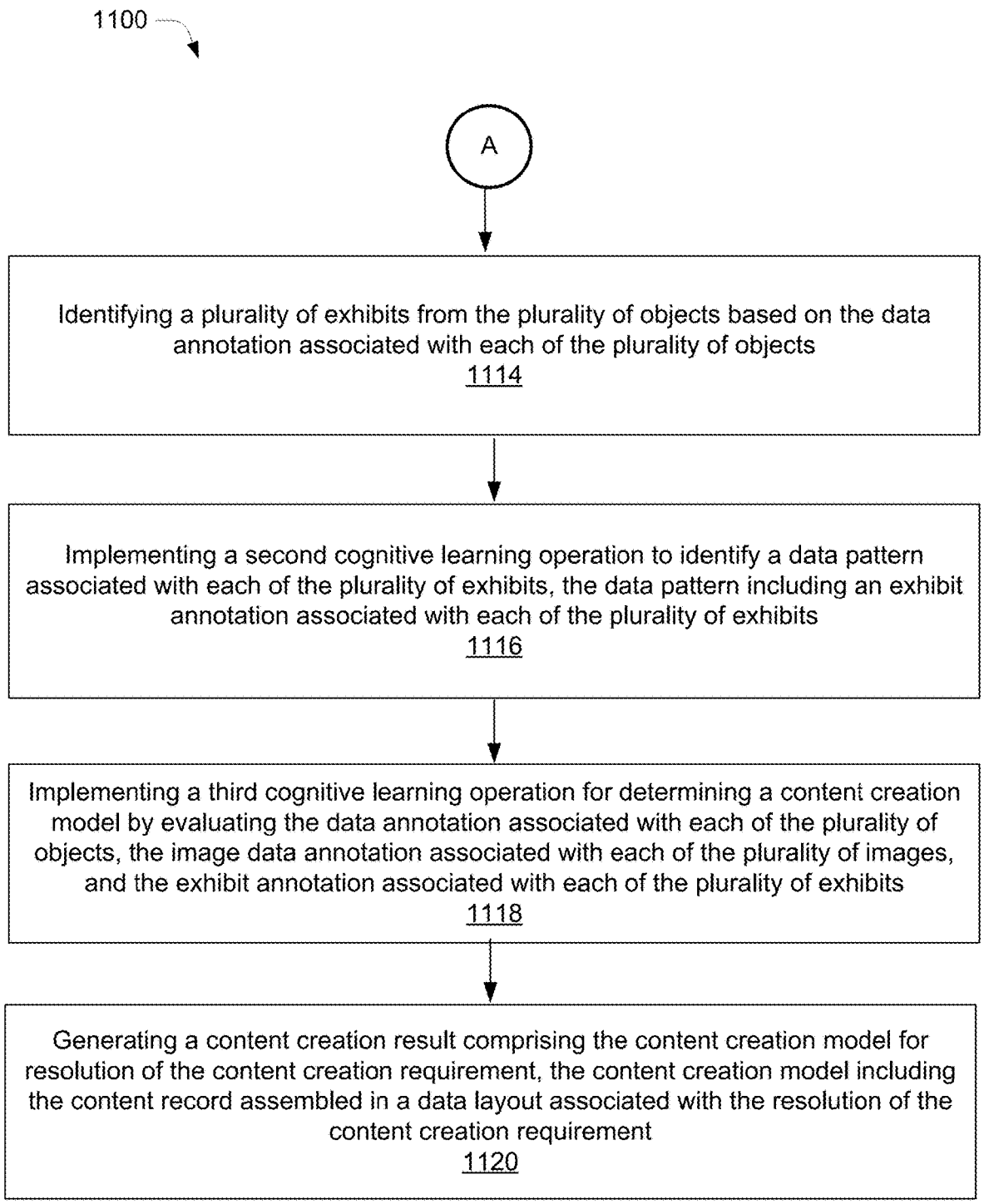

FIGS. 11A and 11B illustrate a process flowchart for content alignment using a content alignment system, according to an example embodiment of the present disclosure.

It should be understood that method steps are shown here for reference only and other combinations of the steps may be possible. Further, the method 1100 may contain some steps in addition to the steps shown in FIG. 11. For the sake of brevity, construction and operational features of the system 110 which are explained in detail in the description of FIGS. 1-10 are not explained in detail in the description of FIG. 11. The method 1100 may be performed by a component of the system 111, such as the processor 120, the data segmenter 130, the image classifier 140, the face classifier 150 and the modeler 160.

At block 1102, a content record 205 may be received from a plurality of sources. The content record 205 may be pertaining to processing a content creation requirement 210 associated with a content creation operation.

At block 1104, the artificial intelligence component 215 may be implemented by the system 110.

At block 1106, the artificial intelligence component 215 may be implemented to sort the content record 205 into a plurality of objects 220. Each of the plurality of objects 220 may be comprising a segment from the content record 205.

At block 1108, the artificial intelligence component 215 may be implemented to evaluate each of the plurality of objects 220 for identifying an object boundary 225 for each of the plurality of objects 220. The object boundary 225 may be including a data annotation 230 associated with each of the plurality of objects 220.

At block 1110, a plurality of images 240 may be identified from the plurality of objects 220 based on the data annotation 230 associated with each of the plurality of objects 220. Each of the plurality of images 240 may be comprising an image segment from the content record 205.

At block 1112, the first cognitive learning operation 235 may be implemented to identify an image boundary 245 for each of the plurality of images 240. The image boundary 245 including an image data annotation 250 associated with each of the plurality of images 240.

At block 1114, a plurality of exhibits 260 may be identified from the plurality of objects 220 based on the data annotation 230 associated with each of the plurality of objects 220. Each the plurality of exhibits 260 may be comprising a display trait from the content record 205.

At block 1116, a second cognitive learning operation 255 may be implemented to identify a data pattern 265 associated with each of the plurality of exhibits 260. The data pattern 265 may be including an exhibit annotation 270 associated with each of the plurality of exhibits 260.

At block 1118, a third cognitive learning operation 275 may be implemented for determining a content creation model 280 by evaluating the data annotation 230 associated with each of the plurality of objects 220, the image data annotation 250 associated with each of the plurality of images 240, and the exhibit annotation 270 associated with each of the plurality of exhibits 260.

At block 1120, a content creation output 285 may be generated. The content creation output 285 may be comprising the content creation model 280 to resolve the content creation requirement. The content creation model 280 may be including the content record 205 assembled in a data layout 290 for resolving the content creation requirement.

In an example, the method 1100 may further include implementing the second cognitive learning operation 255 to identify the data pattern 265 including a content external link, content font information, content font-size information, a content font style information, and a content color information. The method 1100 may further include implementing the second cognitive learning operation 255 to correlate the data pattern 265 associated with each of the plurality of exhibits 260 with the data annotation 230 associated with each of the plurality of objects 220 for determining a plurality of linkages amongst the plurality of objects 220. The method 1100 may further include implementing the second cognitive learning operation 255 to identify a plurality of data pattern 265s associated with each exhibit from the plurality of exhibits 260 based on the display trait associated with each the plurality of exhibits 260.

In an example, the method 1100 may comprise implementing the artificial intelligence component 215 to convert each object from the plurality of objects 220 to an object image for identifying the object boundary 225 for each of the plurality of objects 220.

In an example, the method 1100 may further include comparing the content creation model 280 with the content record 205 for identifying a content deviation to validate the content creation model 280. The third cognitive learning operation 275 may be implemented for rectifying the content deviation to determine an updated content creation model 280.

In an example, the method 1100 may be practiced using a non-transitory computer-readable medium. In an example, the method 1100 may be a computer-implemented method.

The present disclosure provides for a content alignment system, which may generate textual insights while incurring minimal costs. Furthermore, the present disclosure may categorically analyze various parameters that may have an impact on deciding an appropriate alignment relationship amongst various text fragments from a given text document.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a data segmenter coupled to the processor, the data segmenter to:
      receive a content record from a plurality of sources, the content record pertaining to processing a content creation requirement associated with a content creation operation, wherein the content record includes a digital document comprising marketing content related to a product; and
      implement an artificial intelligence component including artificial intelligence techniques selected from a group comprising a neural network approach and a machine learning approach to:
         sort the content record into a plurality of objects, each of the plurality of objects comprising a segment from the content record, wherein the plurality of objects include a block of text; and
         evaluate each of the plurality of objects for identifying an object boundary for each of the plurality of objects, the object boundary including a data annotation associated with each of the plurality of objects, wherein the data annotation indicates identification of at least one of a text, a style, a font, a context, an external link, and an image from the corresponding object;
   an image classifier coupled to the processor, the image classifier to:
      identify a plurality of images from the plurality of objects based on the data annotation associated with each of the plurality of objects, each of the plurality of images comprising an image segment from the content record; and
      implement a first cognitive learning operation to identify an image boundary for each of the plurality of images, the image boundary including an Image data annotation associated with each of the plurality of images, wherein the image data annotation associated with each of the plurality of images includes information related to identification of the corresponding image as at least one of an organization logo, an image of a person, an image of a product, and an image of a hyperlink;
      deploy the image data annotation associated with the image boundary to align the plurality of images in an HTML based format for generating electronic mails associated with a content creation output based on the image data annotation and the data annotation;
   a face classifier coupled to the processor, the face classifier to:
      identify a plurality of exhibits from the plurality of objects based on the data annotation associated with each of the plurality of objects, each of the plurality of exhibits comprising a display trait from the content record, wherein the display trait of the content record comprises any or a combination of a content external link, content font information, content font-size information, content font style information, and content color information; and
      implement a second cognitive learning operation through deployment of a span detection method to identify a data pattern associated with each of the plurality of exhibits, the data pattern including an exhibit annotation associated with each of the plurality of exhibits, the span detection method identifying and dividing the content record with multiple styles some of which are overlapping; and
   a modeler coupled to the processor, the modeler to:
      implement a third cognitive learning operation to determine a content creation model by evaluating the data annotation associated with each of the plurality of objects, the image data annotation associated with each of the plurality of images, and the exhibit annotation associated with each of the plurality of exhibits;
      identify a data layout amongst a plurality of data layouts corresponding to the content record for the content creation output based on analysis of the plurality of data layouts of multiple documents through the implementation of the first cognitive learning operation, the second cognitive learning operation, and the artificial intelligence component to effectively communicate information associated with the content record to a user; and
      generate the content creation output comprising the content creation model to resolve the content creation requirement, the content creation model including the content record assembled in the data layout for resolving the content creation requirement.

2. The system as claimed in claim 1, wherein the face classifier implements the second cognitive learning operation to identify the data pattern for including a content external link, a content font information, a content font-size information, a content font style information, and a content color information.

3. The system as claimed in claim 1, wherein the face classifier implements the second cognitive learning operation to correlate the data pattern associated with each of the plurality of exhibits with the data annotation associated with each of the plurality of objects to determine a plurality of linkages amongst the plurality of objects.

4. The system as claimed in claim 1, wherein the face classifier implements the second cognitive learning operation to identify a plurality of data patterns associated with each exhibit from the plurality of exhibits based on the display trait associated with each the plurality of exhibits.

5. The system as claimed in claim 1, wherein the data segmenter implements the artificial intelligence component to convert each object from the plurality of objects to an object image to identify the object boundary for each of the plurality of objects.

6. The system as claimed in claim 1, wherein the modeler is to compare the content creation model with the content record to identify a content deviation to validate the content creation model.

7. The system as claimed in claim 6, wherein the modeler is to implement the third cognitive learning operation to rectify the content deviation to determine an updated content creation model.

8. A method comprising:
receiving by a processor, a content record from a plurality of sources, the content record pertaining to processing a content creation requirement associated with a content creation operation, wherein the content record includes a digital document comprising marketing content related to a product;
implementing, by the processor, an artificial intelligence component including artificial intelligence techniques selected from a group comprising a neural network approach and a machine learning approach to:
sort the content record into a plurality of objects, each of the plurality of objects comprising a segment from the content record, wherein the plurality of objects include a block of text: and
evaluate each of the plurality of objects for identifying an object boundary for each of the plurality of objects, the object boundary including a data annotation associated with each of the plurality of objects, wherein the data annotation indicates identification of at least one of a text, a style, a font, a context, an external link, and an image from the corresponding object;
identifying, by the processor, a plurality of images from the plurality of objects based on the data annotation associated with each of the plurality of objects, each of the plurality of images comprising an image segment from the content record;
implementing, by the processor, a first cognitive learning operation to identify an image boundary for each of the plurality of images, the image boundary including an image data annotation associated with each of the plurality of images, wherein the image data annotation associated with each of plurality of images includes information related to identification of the corresponding image as at least one of an organization logo, an image of a person, an image of a product, and an image of a hyperlink;
deploying, by the processor, the image data annotation associated with the image boundary to align the plurality of images in an HTML based format for generating electronic mails associated with a content creation output based on the image data annotation and the data annotation;
identifying, by the processor, a plurality of exhibits from the plurality of objects based on the data annotation associated with each of the plurality of objects, each the plurality of exhibits comprising a display trait from the content record, wherein the display trait of the content record comprises any or a combination of a content external link, content font information, content font-size information, content font style information, and content color information;
implementing, by the processor, a second cognitive learning operation through deployment of a span detection method to identify a data pattern associated with each of the plurality of exhibits, the data pattern including an exhibit annotation associated with each of the plurality of exhibits, the span detection method identifying and dividing the content record with multiple styles some of which are overlapping;
implementing, by the processor, a third cognitive learning operation for determining a content creation model by evaluating the data annotation associated with each of the plurality of objects, the image data annotation associated with each of the plurality of images, and the exhibit annotation associated with each of the plurality of exhibits;
identifying, by the processor, a data layout amongst a plurality of data layouts corresponding to the content record for the content creation output based on analysis of the plurality of data layouts of multiple documents through the implementation of the first cognitive learning operation, the second cognitive learning operation, and the artificial intelligence component to effectively communicate information associated with the content record to a user; and
generating, by the processor, the content creation output comprising the content creation model to resolve the content creation requirement, the content creation model including the content record assembled in the data layout for resolving the content creation requirement.

9. The method as claimed in claim 8, wherein the method further comprises implementing, by the processor, the second cognitive learning operation to identify the data pattern including a content external link, a content font information, a content font-size information, a content font style information, and a content color information.

10. The method as claimed in claim 8, wherein the method further comprises implementing, by the processor, the second cognitive learning operation to correlate the data pattern associated with each of the plurality of exhibits with the data annotation associated with each of the plurality of objects for determining a plurality of linkages amongst the plurality of objects.

11. The method as claimed in claim 8, wherein the method further comprises implementing, by the processor, the second cognitive learning operation to identify a plurality of data patterns associated with each exhibit from the plurality of exhibits based on the display trait associated with each the plurality of exhibits.

12. The method as claimed in claim 8, wherein the method further comprises implementing, by the processor, artificial intelligence component to convert each object from the plurality of objects to an object image for identifying the object boundary for each of the plurality of objects.

13. The method as claimed in claim 8, wherein the method further comprises comparing, by the processor, the content creation model with the content record for identifying a content deviation to validate the content creation model.

14. The method as claimed in claim 13, wherein the method further comprises implementing, by the processor, the third cognitive learning operation for rectifying the content deviation to determine an updated content creation model.

15. A non-transitory computer readable medium including machine readable instructions that are executable by a processor to:
  receive a content record from a plurality of sources, the content record pertaining to processing a content creation requirement associated with a content creation operation, wherein the content record includes a digital document comprising marketing content related to a product;
  implement an artificial intelligence component including artificial intelligence techniques selected from a group comprising a neural network approach and a machine learning approach to:
    sort the content record into a plurality of objects, each of the plurality of objects comprising a segment from the content record, wherein the plurality of objects include a block of text; and
    evaluate each of the plurality of objects for identifying an object boundary for each of the plurality of objects, the object boundary including a data annotation associated with each of the plurality of objects, wherein the data annotation indicates identification of at least one of a text, a style, a font, a context, an external link, and an image from the corresponding object;
  identify a plurality of images from the plurality of objects based on the data annotation associated with each of the plurality of objects, each of the plurality of images comprising an image segment from the content record;
  implement a first cognitive learning operation to identify an image boundary for each of the plurality of images, the image boundary including an image data annotation associated with each of the plurality of images, wherein the image data annotation associated with each of plurality of images includes information related to identification of the corresponding image as at least one of an organization logo, an image of a person, an image of a product, and an image of a hyperlink;
  deploy the image data annotation associated with the image boundary to align the plurality of images in an HTML based format for generating electronic mails associated with a content creation output based on the image data annotation and the data annotation;
  identify a plurality of exhibits from the plurality of objects based on the data annotation associated with each of the plurality of objects, each the plurality of exhibits comprising a display trait from the content record, wherein the display trait of the content record comprises any or a combination of a content external link, content font information, content font-size information, content font style information, and content color information;
  implement a second cognitive learning operation through deployment of a span detection method to identify a data pattern associated with each of the plurality of exhibits, the data pattern including an exhibit annotation associated with each of the plurality of exhibits, the span detection method identifying and dividing the content record with multiple styles some of which are overlapping;
  implement a third cognitive learning operation for determining a content creation model by evaluating the data annotation associated with each of the plurality of objects, the image data annotation associated with each of the plurality of images, and the exhibit annotation associated with each of the plurality of exhibits;
  identify a data layout amongst a plurality of data layouts corresponding to the content record for the content creation output based on analysis of the plurality of data layouts of multiple documents through the implementation of the first cognitive learning operation, the second cognitive learning operation, and the artificial intelligence component to effectively communicate information associated with the content record to a user; and
  generate the content creation output comprising the content creation model to resolve the content creation requirement, the content creation model including the content record assembled in the data layout for resolving the content creation requirement.

16. The non-transitory computer-readable medium of claim 15, wherein the processor is to implement the second cognitive learning operation to identify the data pattern for including a content external link, a content font information, a content font-size information, a content font style information, and a content color information.

17. The non-transitory computer-readable medium of claim 15, wherein the processor is to implement the second cognitive learning operation to correlate the data pattern associated with each of the plurality of exhibits with the data annotation associated with each of the plurality of objects for determining a plurality of linkages amongst the plurality of objects.

18. The non-transitory computer-readable medium of claim 15, wherein the processor is to implement the second cognitive learning operation to identify a plurality of data patterns associated with each exhibit from the plurality of exhibits based on the display trait associated with each the plurality of exhibits.

19. The non-transitory computer-readable medium of claim 15, wherein the processor is to implement the artificial intelligence component to convert each object from the plurality of objects to an object image for identifying the object boundary for each of the plurality of objects.

20. The non-transitory computer-readable medium of claim 19, wherein the processor is to compare the content creation model with the content record for identifying a content deviation to validate the content creation model and implement the third cognitive learning operation for rectifying the content deviation to determine an updated content creation model.

* * * * *